(12) United States Patent
Micusik et al.

(10) Patent No.: US 12,299,933 B2
(45) Date of Patent: *May 13, 2025

(54) COLLABORATIVE AUGMENTED REALITY EYEWEAR WITH EGO MOTION ALIGNMENT

(71) Applicant: Snap Inc., Santa Monica, CA (US)

(72) Inventors: Branislav Micusik, St. Andrae-Woerdern (AT); Georgios Evangelidis, Vienna (AT); Daniel Wagner, Vienna (AT)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/442,772

(22) Filed: Feb. 15, 2024

(65) Prior Publication Data

US 2024/0221220 A1  Jul. 4, 2024

Related U.S. Application Data

(63) Continuation of application No. 18/106,655, filed on Feb. 7, 2023, now Pat. No. 11,915,453, which is a continuation of application No. 17/033,061, filed on Sep. 25, 2020, now Pat. No. 11,587,255.

(51) Int. Cl.
| | |
|---|---|
| G06T 7/80 | (2017.01) |
| G02B 27/01 | (2006.01) |
| G06T 7/70 | (2017.01) |
| G06T 19/00 | (2011.01) |
| H04N 23/54 | (2023.01) |
| G05G 9/047 | (2006.01) |

(52) U.S. Cl.
CPC .............. *G06T 7/80* (2017.01); *G02B 27/017* (2013.01); *G06T 7/70* (2017.01); *G06T 19/006* (2013.01); *H04N 23/54* (2023.01); *G05G 9/04737* (2013.01); *G06T 2207/30241* (2013.01); *G06T 2207/30244* (2013.01)

(58) Field of Classification Search
CPC ..... G02B 27/017; G06F 17/16; G06T 19/006; G01S 13/06; G01S 13/867; G01S 13/876; G01S 13/89
See application file for complete search history.

(56) References Cited

U.S. PATENT DOCUMENTS

| | | | |
|---|---|---|---|
| 9,952,664 B2 * | 4/2018 | Border | G06F 3/014 |
| 11,587,255 B1 | 2/2023 | Micusik et al. | |
| 11,915,453 B2 | 2/2024 | Micusik et al. | |

(Continued)

*Primary Examiner* — Nelson M Rosario
(74) *Attorney, Agent, or Firm* — CM Law; Stephen J. Weed

(57) ABSTRACT

Eyewear providing an interactive augmented reality experience between two eyewear devices by using alignment between respective 6DOF trajectories, also referred to herein as ego motion alignment. An eyewear device of user A and an eyewear device of user B track the eyewear device of the other user, or an object of the other user, such as on the user's face, to provide the collaborative AR experience. This enables sharing common three-dimensional content between multiple eyewear users without using or aligning the eyewear devices to common image content such as a marker, which is a more lightweight solution with reduced computational burden on a processor. An inertial measurement unit may also be used to align the eyewear devices.

20 Claims, 14 Drawing Sheets

(56) References Cited

U.S. PATENT DOCUMENTS

| | | |
|---|---|---|
| 2015/0277121 A1 | 10/2015 | Fridental |
| 2020/0249748 A1 | 8/2020 | Ranganathan et al. |
| 2020/0309944 A1 | 10/2020 | Thoresen et al. |
| 2021/0248827 A1 | 8/2021 | Baier et al. |

* cited by examiner

COLLABORATIVE AUGMENTED REALITY EYEWEAR WITH EGO MOTION ALIGNMENT

CROSS-REFERENCE TO RELATED APPLICATIONS

This application is a Continuation of U.S. application Ser. No. 18/106,655 filed on Feb. 7, 2023, which is a Continuation of U.S. application Ser. No. 17/033,061 filed on Sep. 25, 2020, now U.S. Pat. No. 11,587,255, the contents of both of which are incorporated fully herein by reference.

TECHNICAL FIELD

Examples set forth in the present disclosure relate to the field of augmented reality (AR) and wearable mobile devices such as eyewear devices. More particularly, but not by way of limitation, the present disclosure describes collaborative AR, shared AR experience, and user interaction with an interactive AR environment.

BACKGROUND

Many types of computers and electronic devices available today, such as mobile devices (e.g., smartphones, tablets, and laptops), handheld devices, and wearable devices (e.g., smart glasses, digital eyewear, headwear, headgear, and head-mounted displays), include a variety of cameras, sensors, wireless transceivers, input systems (e.g., touch-sensitive surfaces, pointers), peripheral devices, displays, and graphical user interfaces (GUIs) through which a user can interact with displayed content.

AR combines real objects in a physical environment with virtual objects and displays the combination to a user. The combined display gives the impression that the virtual objects are authentically present in the environment, especially when the virtual objects appear and behave like the real objects.

BRIEF DESCRIPTION OF THE DRAWINGS

Features of the various examples described will be readily understood from the following detailed description, in which reference is made to the figures. A reference numeral is used with each element in the description and throughout the several views of the drawing. When a plurality of similar elements is present, a single reference numeral may be assigned to like elements, with an added lower-case letter referring to a specific element.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures.

DETAILED DESCRIPTION

Figure 1A:
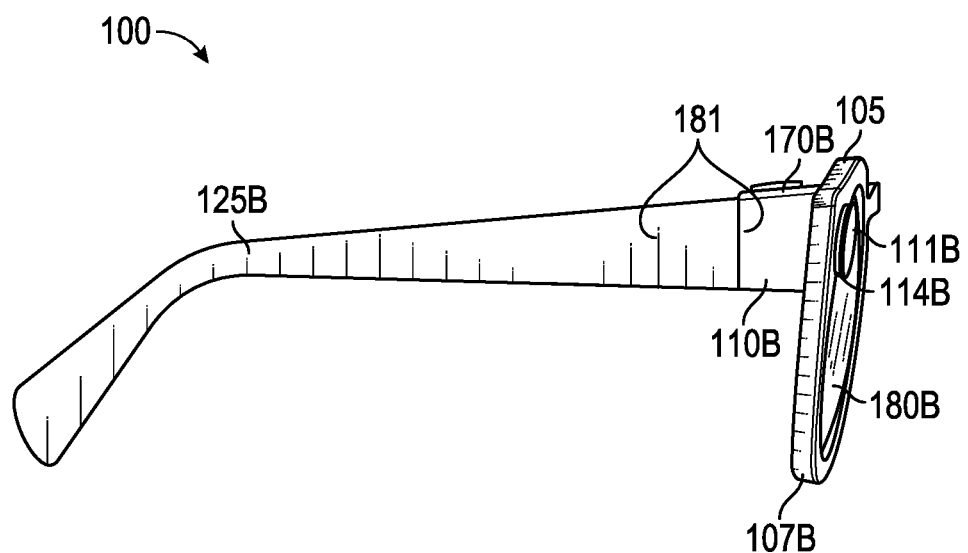
FIG. 1A is a side view (right) of an example hardware configuration of an eyewear device suitable for use in an augmented reality production system.

Eyewear providing an interactive augmented reality (AR) experience between two eyewear devices by using alignment between respective six degrees of freedom (6DOF) tracker trajectories generated by 6DOF pose trackers, also referred to herein as ego motion alignment. The 6DOF pose tracker may comprise a visual inertial odometry (VIO) pose tracker. An eyewear device of user A and an eyewear device of user B track the eyewear device of the other user, or an object of the other user, such as on the user's face, to provide necessary information that allows collaborative AR. This enables sharing common three-dimensional (3D) content between multiple eyewear users without using or aligning the eyewear devices to a common scene or image content such as a marker, which is a more lightweight solution with reduced computational burden on a processor. It is sufficient to run a local odometry system on every eyewear device to avoid the full global mapping pipeline, which saves memory as well as computational resources. This allows users of eyewear devices to add virtual 3D content and the other users can see the added 3D content through their eyewear device. Each user can simultaneously modify the virtual 3D content. In addition, ego motion is also suitable to know a location of each user to all others at periodic time instances. For instance, knowing a user A is closer to user B less than 2 meters may trigger displaying some spatial dependent content or trigger a sound alarm. An inertial measurement unit (IMU) may also be used to align the eyewear devices.

The following detailed description includes systems, methods, techniques, instruction sequences, and computing machine program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and method described because the relevant teachings can be applied or practice in a variety of ways. The terminology and nomenclature used herein is for the purpose of describing particular aspects only and is not intended to be limiting. In general, well-known instruction instances, protocols, structures, and techniques are not necessarily shown in detail.

The terms "coupled" or "connected" as used herein refer to any logical, optical, physical, or electrical connection, including a link or the like by which the electrical or magnetic signals produced or supplied by one system element are imparted to another coupled or connected system element. Unless described otherwise, coupled or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element that is integrated into or supported by the element.

The term "proximal" is used to describe an item or part of an item that is situated near, adjacent, or next to an object or person; or that is closer relative to other parts of the item, which may be described as "distal." For example, the end of an item nearest an object may be referred to as the proximal end, whereas the generally opposing end may be referred to as the distal end.

The orientations of the eyewear device, other mobile devices, associated components and any other devices incorporating a camera, an inertial measurement unit, or both such as shown in any of the drawings, are given by way of example only, for illustration and discussion purposes. In operation, the eyewear device may be oriented in any other direction suitable to the particular application of the eyewear device; for example, up, down, sideways, or any other orientation. Also, to the extent used herein, any directional term, such as front, rear, inward, outward, toward, left, right, lateral, longitudinal, up, down, upper, lower, top, bottom, side, horizontal, vertical, and diagonal are used by way of example only, and are not limiting as to the direction or orientation of any camera or inertial measurement unit as constructed or as otherwise described herein.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and discussed below.

FIG. 1A is a side view (right) of an example hardware configuration of an eyewear device 100 which includes a touch-sensitive input device or touchpad 181. The eyewear device 100 is also referred to simply as eyewear throughout this specification. As shown, the touchpad 181 may have a boundary that is subtle and not easily seen; alternatively, the boundary may be plainly visible or include a raised or otherwise tactile edge that provides feedback to the user about the location and boundary of the touchpad 181. In other implementations, the eyewear device 100 may include a touchpad on the left side.

The surface of the touchpad 181 is configured to detect finger touches, taps, and gestures (e.g., moving touches) for use with a GUI displayed by the eyewear device, on an image display, to allow the user to navigate through and select menu options in an intuitive manner, which enhances and simplifies the user experience.

Detection of finger inputs on the touchpad 181 can enable several functions. For example, touching anywhere on the touchpad 181 may cause the GUI to display or highlight an item on the image display, which may be projected onto at least one of the optical assemblies 180A, 180B. Double tapping on the touchpad 181 may select an item or icon. Sliding or swiping a finger in a particular direction (e.g., from front to back, back to front, up to down, or down to) may cause the items or icons to slide or scroll in a particular direction; for example, to move to a next item, icon, video, image, page, or slide. Sliding the finger in another direction may slide or scroll in the opposite direction; for example, to move to a previous item, icon, video, image, page, or slide. The touchpad 181 can be virtually anywhere on the eyewear device 100.

In one example, an identified finger gesture of a single tap on the touchpad 181, initiates selection or pressing of a graphical user interface element in the image presented on the image display of the optical assembly 180A, 180B. An adjustment to the image presented on the image display of the optical assembly 180A, 180B based on the identified finger gesture can be a primary action which selects or submits the graphical user interface element on the image display of the optical assembly 180A, 180B for further display or execution.

As shown, the eyewear device 100 includes a right visible-light camera 114B. As further described herein, two cameras 114A, 114B capture image information for a scene from two separate viewpoints. The two captured images may be used to project a three-dimensional display onto an image display for viewing with 3D glasses.

Figure 1B:
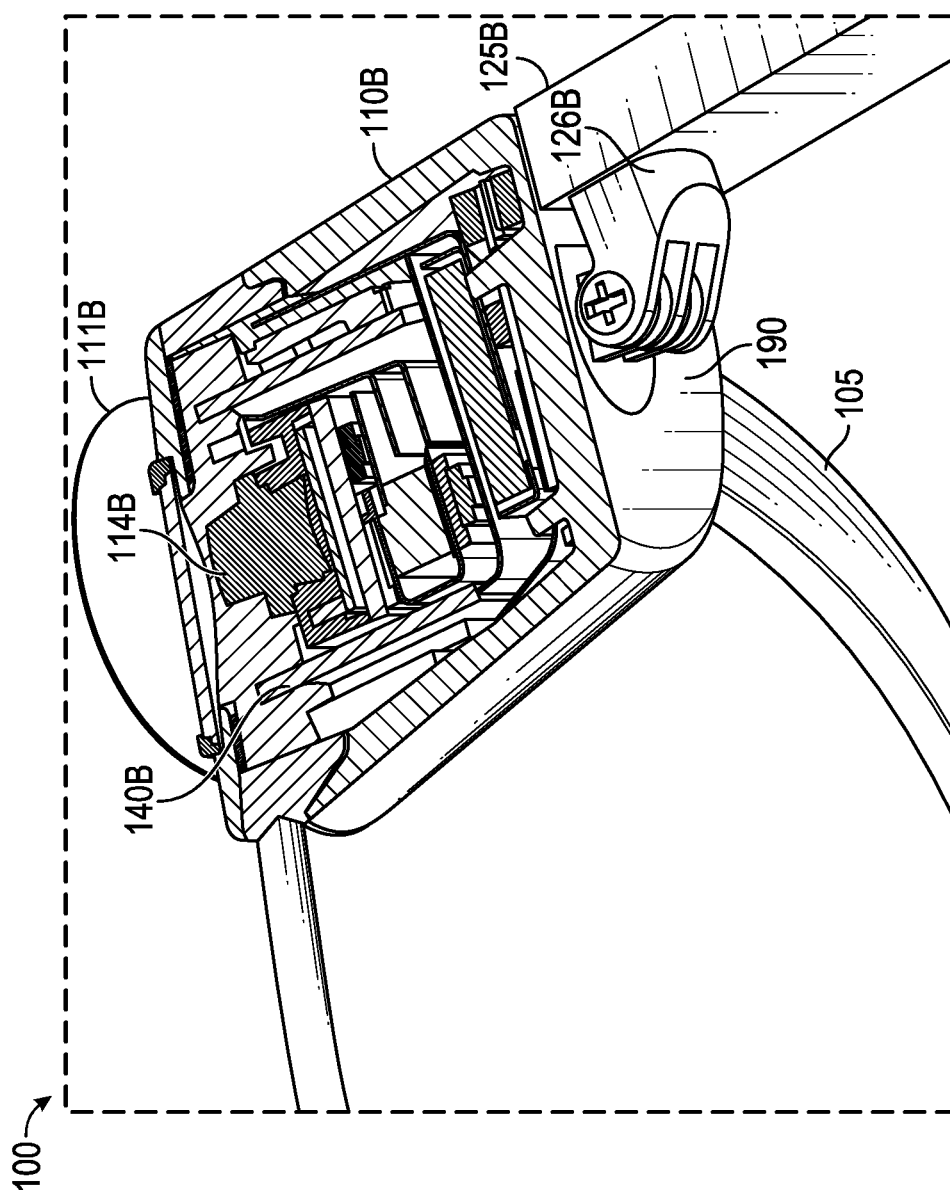
FIG. 1B is a perspective, partly sectional view of a right corner of the eyewear device of FIG. 1A depicting a right visible-light camera, and a circuit board.
Figure 1C:
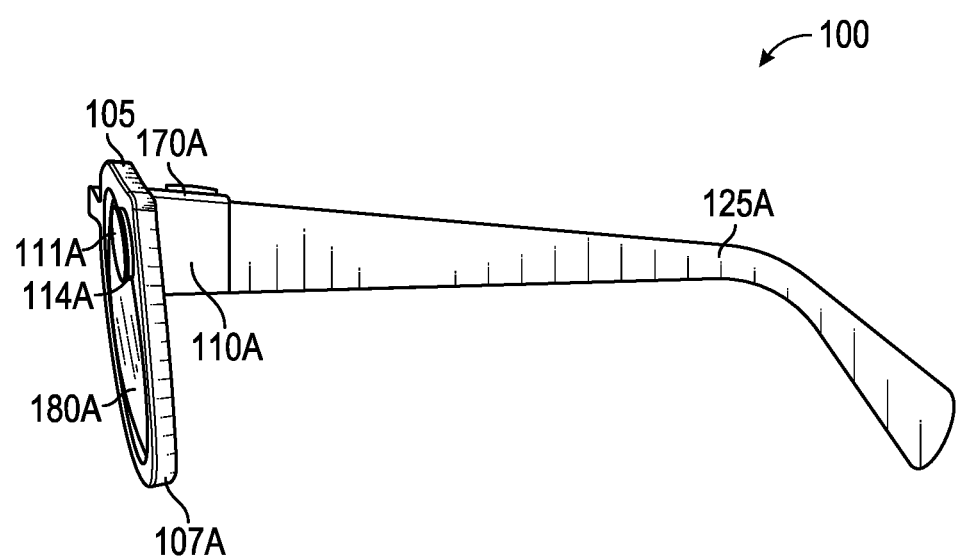
FIG. 1C is a side view (left) of an example hardware configuration of the eyewear device of FIG. 1A, which shows a left visible-light camera.
Figure 1D:
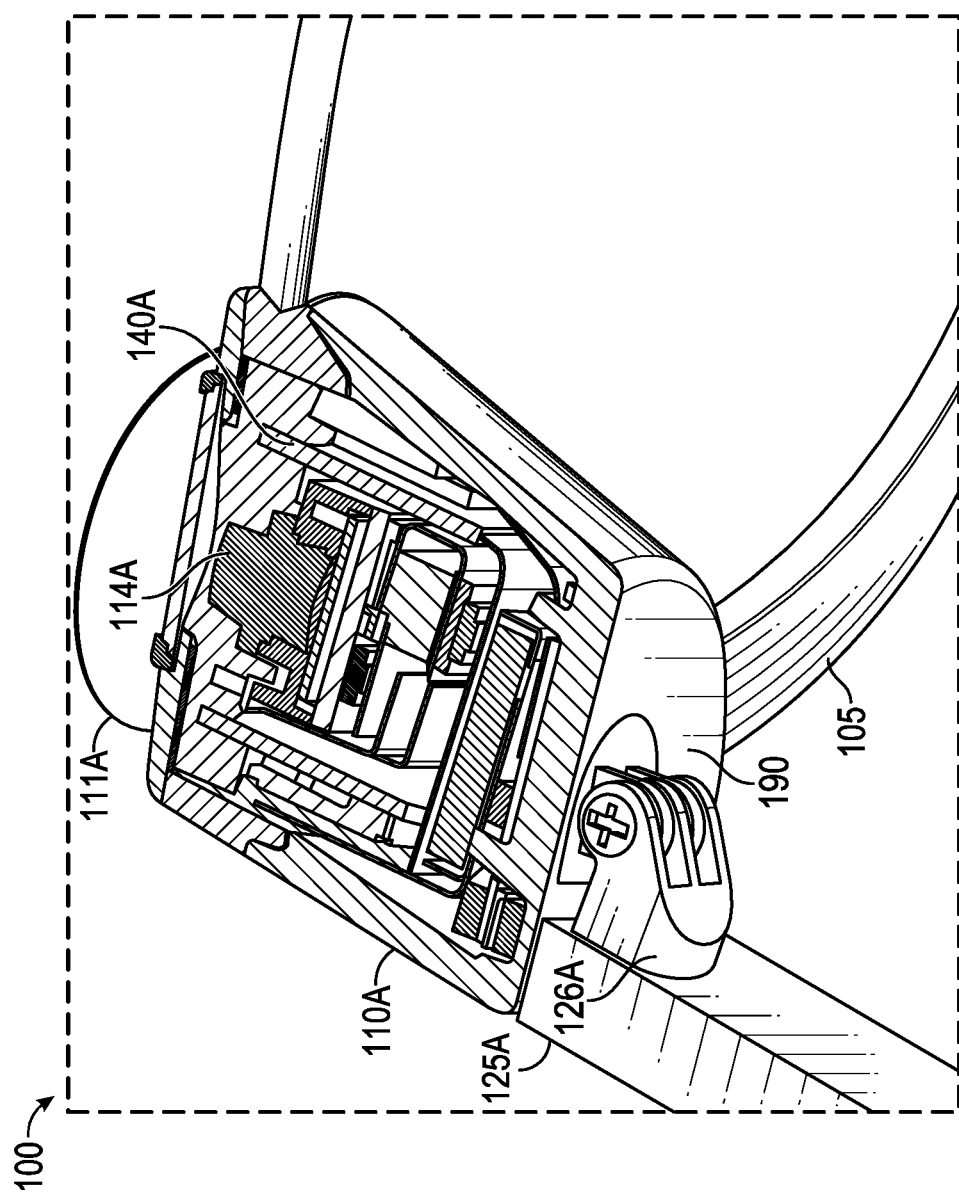
FIG. 1D is a perspective, partly sectional view of a left corner of the eyewear device of FIG. 1C depicting the left visible-light camera, and a circuit board.

The eyewear device 100 includes a right optical assembly 180B with an image display to present images, such as depth images. As shown in FIGS. 1A and 1B, the eyewear device 100 includes the right visible-light camera 114B. The eyewear device 100 can include multiple visible-light cameras 114A, 114B that form a passive type of three-dimensional camera, such as stereo camera, of which the right visible-light camera 114B is located on a right corner 110B. As shown in FIGS. 1C-D, the eyewear device 100 also includes a left visible-light camera 114A.

Figure 3:
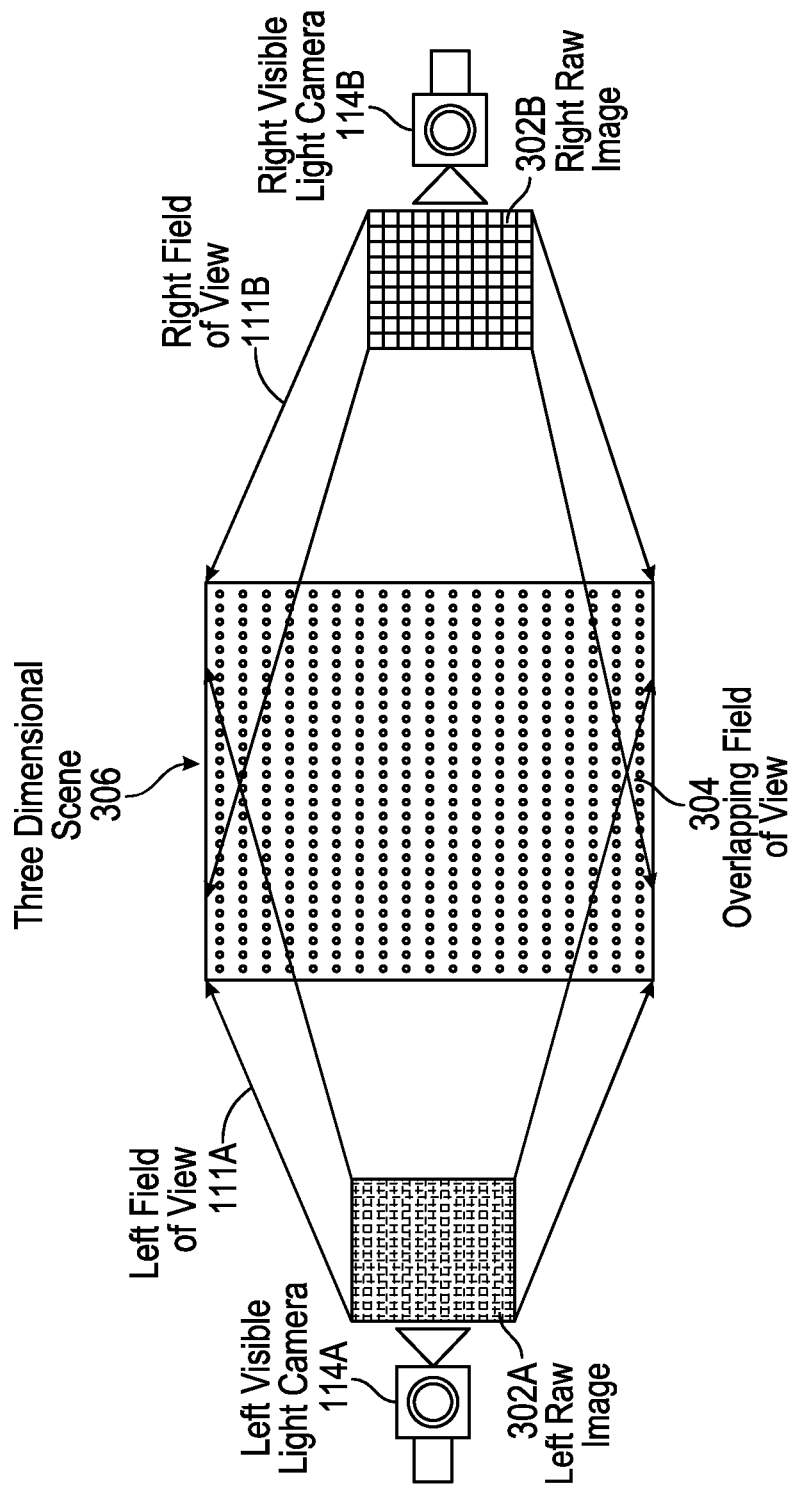
FIG. 3 is a diagrammatic depiction of a three-dimensional scene, a left raw image captured by a left visible-light camera, and a right raw image captured by a right visible-light camera.

Left and right visible-light cameras 114A, 114B are sensitive to the visible-light range wavelength. Each of the visible-light cameras 114A, 114B have a different frontward facing field of view which are overlapping to enable generation of three-dimensional depth images, for example, right visible-light camera 114B depicts a right field of view 111B. Generally, a "field of view" is the part of the scene that is visible through the camera at a particular position and orientation in space. The fields of view 111A and 111B have an overlapping field of view 304 (FIG. 3). Objects or object features outside the field of view 111A, 111B when the visible-light camera captures the image are not recorded in a raw image (e.g., photograph or picture). The field of view describes an angle range or extent, which the image sensor of the visible-light camera 114A, 114B picks up electromagnetic radiation of a given scene in a captured image of the given scene. Field of view can be expressed as the angular size of the view cone; i.e., an angle of view. The angle of view can be measured horizontally, vertically, or diagonally.

In an example, visible-light cameras 114A, 114B have a field of view (FoV) with an angle of view between 15° to 30°, for example 24°, and have a resolution of 480×480 pixels. In another example, a larger FoV is obtained using a wide angle camera having a FoV of 100°. The "angle of coverage" describes the angle range that a lens of visible-light cameras 114A, 114B or infrared camera 410 (see FIG. 2A) can effectively image. Typically, the camera lens produces an image circle that is large enough to cover the film or sensor of the camera completely, possibly including some vignetting (e.g., a darkening of the image toward the edges when compared to the center). If the angle of coverage of the camera lens does not fill the sensor, the image circle will be visible, typically with strong vignetting toward the edge, and the effective angle of view will be limited to the angle of coverage.

Examples of such visible-light cameras 114A, 114B include a high-resolution complementary metal-oxide-semiconductor (CMOS) image sensor and a digital VGA camera (video graphics array) capable of resolutions of 640p (e.g., 640×480 pixels for a total of 0.3 megapixels), 720p, or 1080p. Other examples of visible-light cameras 114A, 114B that can capture high-definition (HD) still images and store them at a resolution of 1642 by 1642 pixels (or greater); or record high-definition video at a high frame rate (e.g., thirty to sixty frames per second or more) and store the recording at a resolution of 1216 by 1216 pixels (or greater).

The eyewear device 100 may capture image sensor data from the visible-light cameras 114A, 114B along with geolocation data, digitized by an image processor, for storage in a memory. The visible-light cameras 114A, 114B capture respective left and right raw images in the two-dimensional space domain that comprise a matrix of pixels on a two-dimensional coordinate system that includes an X-axis for horizontal position and a Y-axis for vertical position. Each pixel includes a color attribute value (e.g., a red pixel light value, a green pixel light value, or a blue pixel light value); and a position attribute (e.g., an X-axis coordinate and a Y-axis coordinate).

In order to capture stereo images for later display as a three-dimensional projection, the image processor 412 (shown in FIG. 4) may be coupled to the visible-light cameras 114A, 114B to receive and store the visual image information. The image processor 412, or another processor, controls operation of the visible-light cameras 114A, 114B to act as a stereo camera simulating human binocular vision and may add a timestamp to each image. The timestamp on each pair of images allows display of the images together as part of a three-dimensional projection. Three-dimensional projections produce an immersive, life-like experience that is desirable in a variety of contexts, including virtual reality (VR) and video gaming.

FIG. 1B is a perspective, cross-sectional view of a right corner 110B of the eyewear device 100 of FIG. 1A depicting the right visible-light camera 114B of the camera system, and a circuit board. FIG. 1C is a side view (left) of an example hardware configuration of an eyewear device 100 of FIG. 1A, which shows a left visible-light camera 114A of the camera system. FIG. 1D is a perspective, cross-sectional view of a left corner 110A of the eyewear device of FIG. 1C depicting the left visible-light camera 114A of the three-dimensional camera, and a circuit board.

Construction and placement of the left visible-light camera 114A is substantially similar to the right visible-light camera 114B, except the connections and coupling are on the left lateral side 170A. As shown in the example of FIG. 1B, the eyewear device 100 includes the right visible-light camera 114B and a circuit board 140B, which may be a flexible printed circuit board (PCB). The right hinge 126B connects the right corner 110B to a right temple 125B of the eyewear device 100. In some examples, components of the right visible-light camera 114B, the flexible PCB 140B, or other electrical connectors or contacts may be located on the right temple 125B or the right hinge 126B.

The right corner 110B includes corner body 190 and a corner cap, with the corner cap omitted in the cross-section of FIG. 1B. Disposed inside the right corner 110B are various interconnected circuit boards, such as PCBs or flexible PCBs, that include controller circuits for right visible-light camera 114B, microphone(s), low-power wireless circuitry (e.g., for wireless short range network communication via Bluetooth™), high-speed wireless circuitry (e.g., for wireless local area network communication via Wi-Fi).

Figure 2A:
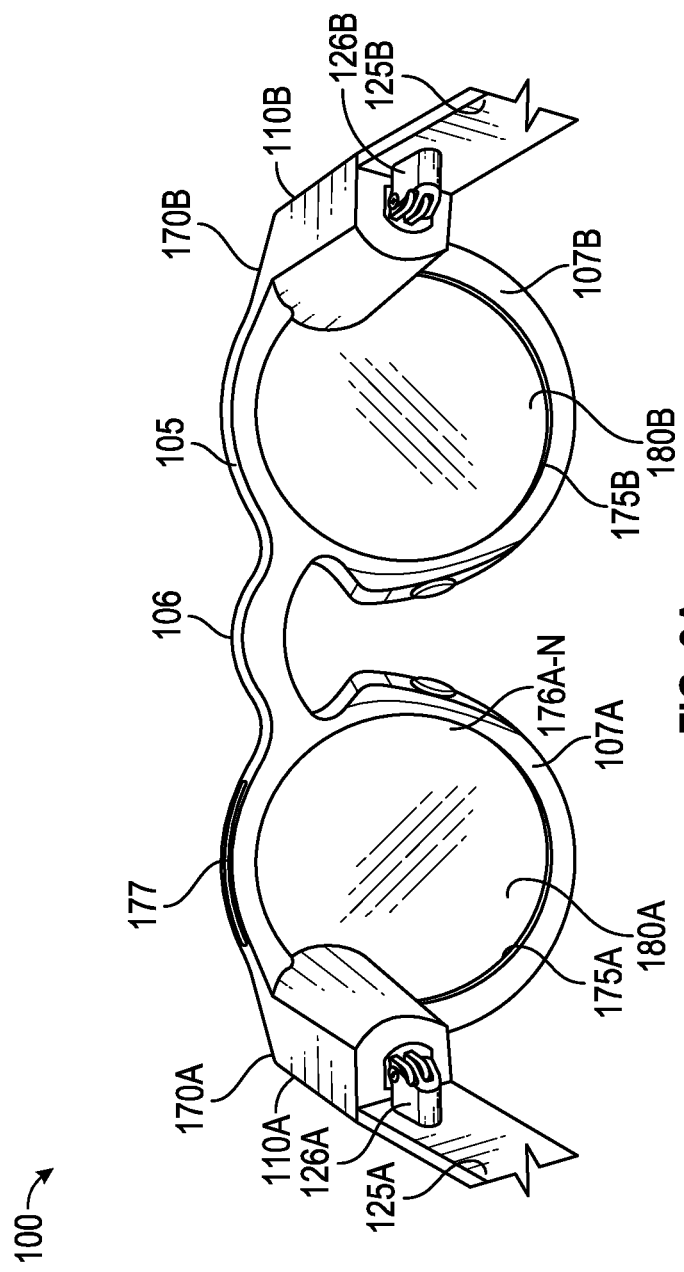
FIGS. 2A and 2B are rear views of example hardware configurations of an eyewear device utilized in the augmented reality production system.

The right visible-light camera 114B is coupled to or disposed on the flexible PCB 140B and covered by a visible-light camera cover lens, which is aimed through opening(s) formed in the frame 105. For example, the right rim 107B of the frame 105, shown in FIG. 2A, is connected to the right corner 110B and includes the opening(s) for the visible-light camera cover lens. The frame 105 includes a front side configured to face outward and away from the eye of the user. The opening for the visible-light camera cover lens is formed on and through the front or outward-facing side of the frame 105. In the example, the right visible-light camera 114B has an outward-facing field of view 111B (shown in FIG. 3) with a line of sight or perspective that is correlated with the right eye of the user of the eyewear device 100. The visible-light camera cover lens can also be adhered to a front side or outward-facing surface of the right corner 110B in which an opening is formed with an outward-facing angle of coverage, but in a different outwardly direction. The coupling can also be indirect via intervening components.

As shown in FIG. 1B, flexible PCB 140B is disposed inside the right corner 110B and is coupled to one or more other components housed in the right corner 110B. Although shown as being formed on the circuit boards of the right corner 110B, the right visible-light camera 114B can be formed on the circuit boards of the left corner 110A, the temples 125A, 125B, or the frame 105.

Figure 2B:
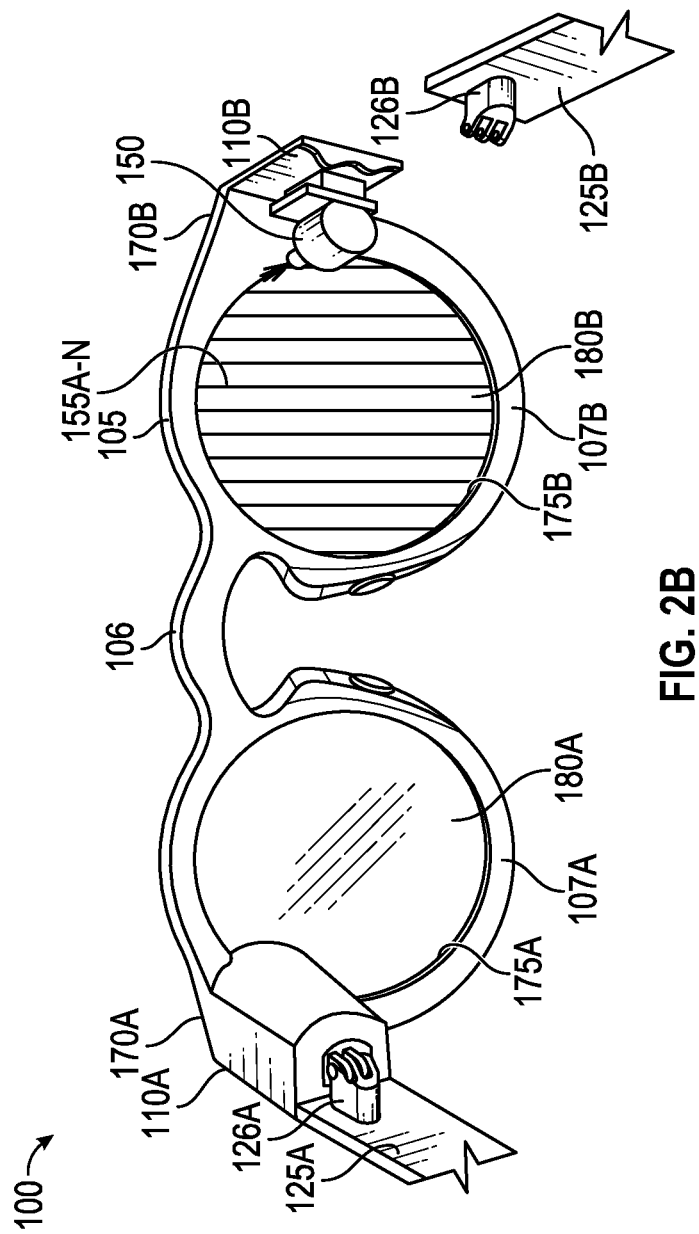

FIGS. 2A and 2B are perspective views, from the rear, of example hardware configurations of the eyewear device 100, including two different types of image displays. The eyewear device 100 is sized and shaped in a form configured for wearing by a user; the form of eyeglasses is shown in the example. The eyewear device 100 can take other forms and may incorporate other types of frameworks; for example, a headgear, a headset, or a helmet.

In the eyeglasses example, eyewear device 100 includes a frame 105 including a left rim 107A connected to a right rim 107B via a bridge 106 adapted to be supported by a nose of the user. The left and right rims 107A, 107B include respective apertures 175A, 175B, which hold a respective optical element 180A, 180B, such as a lens and a display device. As used herein, the term "lens" is meant to include transparent or translucent pieces of glass or plastic having curved or flat surfaces that cause light to converge/diverge or that cause little or no convergence or divergence.

Although shown as having two optical elements 180A, 180B, the eyewear device 100 can include other arrangements, such as a single optical element (or it may not include any optical element 180A, 180B), depending on the application or the intended user of the eyewear device 100. As further shown, eyewear device 100 includes a left corner 110A adjacent the left lateral side 170A of the frame 105 and a right corner 110B adjacent the right lateral side 170B of the frame 105. The corners 110A, 110B may be integrated into the frame 105 on the respective sides 170A, 170B (as illustrated) or implemented as separate components attached to the frame 105 on the respective sides 170A, 170B. Alternatively, the corners 110A, 110B may be integrated into temples (not shown) attached to the frame 105.

In one example, the image display of optical assembly 180A, 180B includes an integrated image display. As shown in FIG. 2A, each optical assembly 180A, 180B includes a suitable display matrix 177, such as a liquid crystal display (LCD), an organic light-emitting diode (OLED) display, or any other such display. Each optical assembly 180A, 180B also includes an optical layer or layers 176, which can include lenses, optical coatings, prisms, mirrors, waveguides, optical strips, and other optical components in any combination. The optical layers 176A, 176B, ... 176N (shown as 176A-N in FIG. 2A and herein) can include a prism having a suitable size and configuration and including a first surface for receiving light from a display matrix and a second surface for emitting light to the eye of the user. The prism of the optical layers 176A-N extends over all or at least a portion of the respective apertures 175A, 175B formed in the left and right rims 107A, 107B to permit the user to see the second surface of the prism when the eye of the user is viewing through the corresponding left and right rims 107A, 107B. The first surface of the prism of the optical layers 176A-N faces upwardly from the frame 105 and the display matrix 177 overlies the prism so that photons and light emitted by the display matrix 177 impinge the first surface. The prism is sized and shaped so that the light is refracted within the prism and is directed toward the eye of the user by the second surface of the prism of the optical layers 176A-N. In this regard, the second surface of the prism of the optical layers 176A-N can be convex to direct the light toward the center of the eye. The prism can optionally be sized and shaped to magnify the image projected by the display matrix 177, and the light travels through the prism so that the image viewed from the second surface is larger in one or more dimensions than the image emitted from the display matrix 177.

In one example, the optical layers 176A-N may include an LCD layer that is transparent (keeping the lens open) unless and until a voltage is applied which makes the layer opaque (closing or blocking the lens). The image processor 412 on the eyewear device 100 may execute programming to apply the voltage to the LCD layer in order to produce an active shutter system, making the eyewear device 100 suitable for viewing visual content when displayed as a three-dimensional projection. Technologies other than LCD may be used for the active shutter mode, including other types of reactive layers that are responsive to a voltage or another type of input.

In another example, the image display device of optical assembly 180A, 180B includes a projection image display as shown in FIG. 2B. Each optical assembly 180A, 180B includes a laser projector 150, which is a three-color laser projector using a scanning mirror or galvanometer. During operation, an optical source such as a laser projector 150 is disposed in or on one of the temples 125A, 125B of the eyewear device 100. Optical assembly 180B in this example includes one or more optical strips 155A, 155B, ... 155N (shown as 155A-N in FIG. 2B) which are spaced apart and across the width of the lens of each optical assembly 180A, 180B or across a depth of the lens between the front surface and the rear surface of the lens.

As the photons projected by the laser projector 150 travel across the lens of each optical assembly 180A, 180B, the photons encounter the optical strips 155A-N. When a particular photon encounters a particular optical strip, the photon is either redirected toward the user's eye, or it passes to the next optical strip. A combination of modulation of laser projector 150, and modulation of optical strips, may control specific photons or beams of light. In an example, a processor controls optical strips 155A-N by initiating mechanical, acoustic, or electromagnetic signals. Although shown as having two optical assemblies 180A, 180B, the eyewear device 100 can include other arrangements, such as a single or three optical assemblies, or each optical assembly 180A, 180B may have arranged different arrangement depending on the application or intended user of the eyewear device 100.

As further shown in FIGS. 2A and 2B, eyewear device 100 includes a left corner 110A adjacent the left lateral side 170A of the frame 105 and a right corner 110B adjacent the right lateral side 170B of the frame 105. The corners 110A, 110B may be integrated into the frame 105 on the respective lateral sides 170A, 170B (as illustrated) or implemented as separate components attached to the frame 105 on the respective sides 170A, 170B. Alternatively, the corners 110A, 110B may be integrated into temples 125A, 125B attached to the frame 105.

In another example, the eyewear device 100 shown in FIG. 2B may include two projectors, a left projector 150A (not shown) and a right projector 150B (shown as projector 150). The left optical assembly 180A may include a left display matrix 177A (not shown) or a left set of optical strips 155'A, 155'B, ... 155'N (155 prime, A through N, not shown) which are configured to interact with light from the left projector 150A. Similarly, the right optical assembly 180B may include a right display matrix 177B (not shown) or a right set of optical strips 155"A, 155"B, ... 155"N (155 double prime, A through N, not shown) which are configured to interact with light from the right projector 150B. In this example, the eyewear device 100 includes a left display and a right display.

FIG. 3 is a diagrammatic depiction of a three-dimensional scene 306, a left raw image 302A captured by a left visible-light camera 114A, and a right raw image 302B captured by a right visible-light camera 114B. The left field of view 111A may overlap, as shown, with the right field of view 111B. The overlapping field of view 304 represents that portion of the image captured by both cameras 114A, 114B. The term 'overlapping' when referring to field of view means the matrix of pixels in the generated raw images overlap by thirty percent (30%) or more. 'Substantially overlapping' means the matrix of pixels in the generated raw images—or in the infrared image of scene—overlap by fifty percent (50%) or more. As described herein, the two raw images 302A, 302B may be processed to include a timestamp, which allows the images to be displayed together as part of a three-dimensional projection.

For the capture of stereo images, as illustrated in FIG. 3, a pair of raw red, green, and blue (RGB) images are captured of a real scene 306 at a given moment in time—a left raw image 302A captured by the left camera 114A and right raw image 302B captured by the right camera 114B. When the pair of raw images 302A, 302B are processed (e.g., by the image processor 412), depth images are generated. The generated depth images may be viewed on an optical assembly 180A, 180B of an eyewear device, on another display (e.g., the image display 580 on a mobile device 401), or on a screen.

The generated depth images are in the three-dimensional space domain and can comprise a matrix of vertices on a three-dimensional location coordinate system that includes an X axis for horizontal position (e.g., length), a Y axis for vertical position (e.g., height), and a Z axis for depth (e.g., distance). Each vertex may include a color attribute (e.g., a red pixel light value, a green pixel light value, or a blue pixel light value); a position attribute (e.g., an X location coordinate, a Y location coordinate, and a Z location coordinate); a texture attribute; a reflectance attribute; or a combination thereof. The texture attribute quantifies the perceived texture of the depth image, such as the spatial arrangement of color or intensities in a region of vertices of the depth image.

In one example, the interactive augmented reality system 400 (FIG. 4) includes the eyewear device 100, which includes a frame 105 and a left temple 110A extending from a left lateral side 170A of the frame 105 and a right temple 125B extending from a right lateral side 170B of the frame 105. The eyewear device 100 may further include at least two visible-light cameras 114A, 114B having overlapping fields of view. In one example, the eyewear device 100 includes a left visible-light camera 114A with a left field of view 111A, as illustrated in FIG. 3. The left camera 114A is connected to the frame 105 or the left temple 110A to capture a left raw image 302A from the left side of scene 306. The eyewear device 100 further includes a right visible-light camera 114B with a right field of view 111B. The right camera 114B is connected to the frame 105 or the right temple 125B to capture a right raw image 302B from the right side of scene 306.

Figure 4:
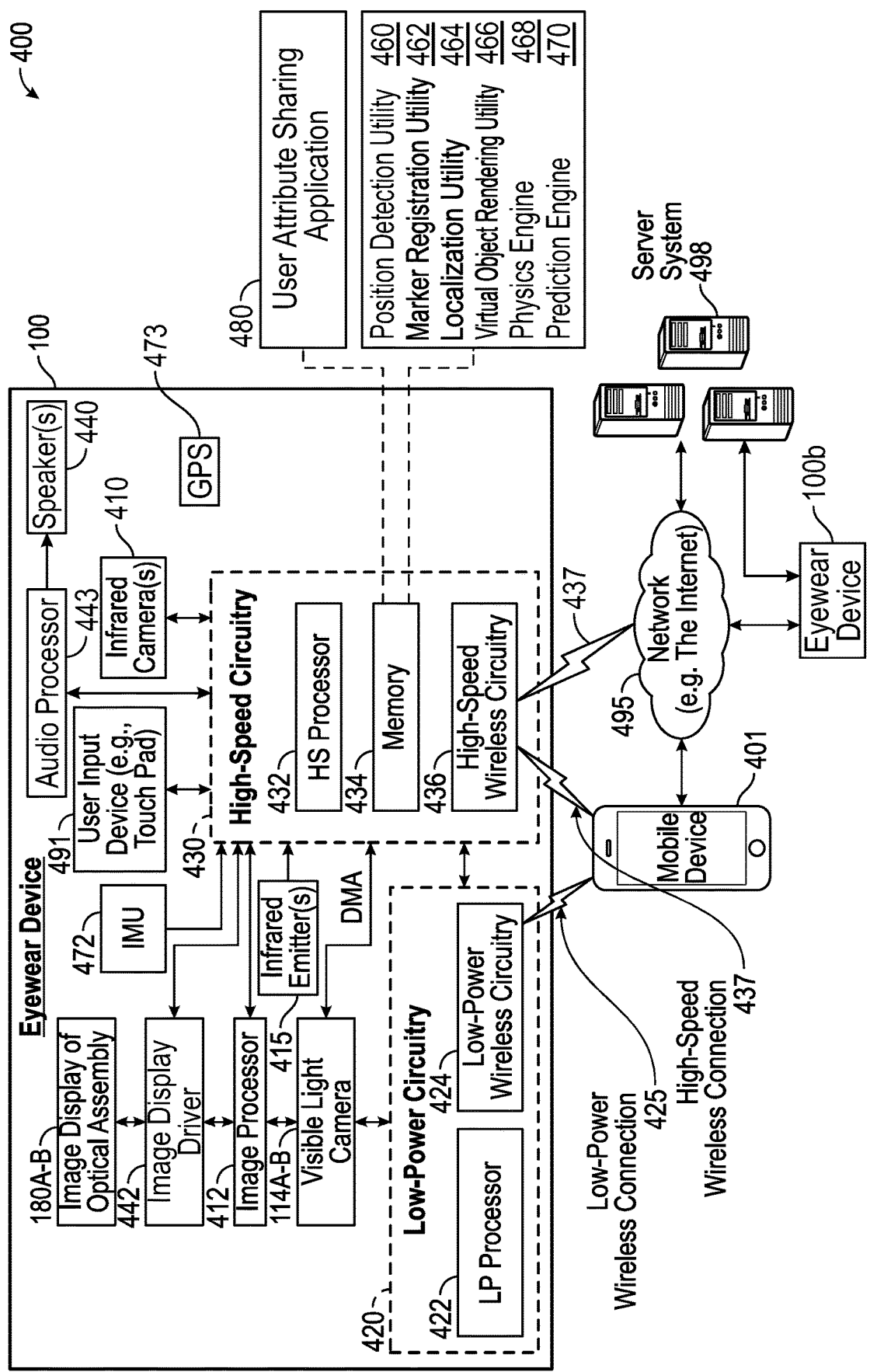
FIG. 4 is a functional block diagram of an example augmented reality production system including a wearable device (e.g., an eyewear device) and a server system connected via various networks.

FIG. 4 is a functional block diagram of an example interactive augmented reality system 400 that includes a wearable device (e.g., an eyewear device 100), a mobile device 401, and a server system 498 connected via various networks 495 such as the Internet. The interactive augmented reality system 400 includes a low-power wireless connection 425 and a high-speed wireless connection 437 between the eyewear device 100 and the mobile device 401.

As shown in FIG. 4, the eyewear device 100 includes one or more visible-light cameras 114A, 114B that capture still images, video images, or both still and video images, as described herein. The cameras 114A, 114B may have a direct memory access (DMA) to high-speed circuitry 430 and function as a stereo camera. The cameras 114A, 114B may be used to capture initial-depth images that may be rendered into three-dimensional (3D) models that are texture-mapped images of a red, green, and blue (RGB) imaged scene. The device 100 may also include a depth sensor, which uses infrared signals to estimate the position of objects relative to the device 100. The depth sensor in some examples includes one or more infrared emitter(s) and infrared camera(s) 410.

The eyewear device 100 further includes two image displays of each optical assembly 180A, 180B (one associated with the left side 170A and one associated with the right side 170B). The eyewear device 100 also includes an image display driver 442, an image processor 412, low-power circuitry 420, and high-speed circuitry 430. The image displays of each optical assembly 180A, 180B are for presenting images, including still images, video images, or still and video images. The image display driver 442 is coupled to the image displays of each optical assembly 180A, 180B in order to control the display of images.

The eyewear device 100 additionally includes one or more speakers 440 (e.g., one associated with the left side of the eyewear device and another associated with the right side of the eyewear device). The speakers 440 may be incorporated into the frame 105, temples 125, or corners 110 of the eyewear device 100. The one or more speakers 440 are driven by audio processor 443 under control of low-power circuitry 420, high-speed circuitry 430, or both. The speakers 440 are for presenting audio signals including, for example, a beat track. The audio processor 443 is coupled to the speakers 440 in order to control the presentation of sound.

The components shown in FIG. 4 for the eyewear device 100 are located on one or more circuit boards, for example a printed circuit board (PCB) or flexible printed circuit (FPC), located in the rims or temples. Alternatively, or additionally, the depicted components can be located in the corners, frames, hinges, or bridge of the eyewear device 100. Left and right visible-light cameras 114A, 114B can include digital camera elements such as a complementary metal-oxide-semiconductor (CMOS) image sensor, a charge-coupled device, a lens, or any other respective visible or light capturing elements that may be used to capture data, including still images or video of scenes with unknown objects.

As shown in FIG. 4, high-speed circuitry 430 includes a high-speed processor 432, a memory 434, and high-speed wireless circuitry 436. In the example, the image display driver 442 is coupled to the high-speed circuitry 430 and operated by the high-speed processor 432 in order to drive the left and right image displays of each optical assembly 180A, 180B. High-speed processor 432 may be any processor capable of managing high-speed communications and operation of any general computing system needed for eyewear device 100. High-speed processor 432 includes processing resources needed for managing high-speed data transfers on high-speed wireless connection 437 to a wireless local area network (WLAN) using high-speed wireless circuitry 436.

In some examples, the high-speed processor 432 executes an operating system such as a LINUX operating system or other such operating system of the eyewear device 100 and the operating system is stored in memory 434 for execution. In addition to any other responsibilities, the high-speed processor 432 executes a software architecture for the eyewear device 100 that is used to manage data transfers with high-speed wireless circuitry 436. In some examples, high-speed wireless circuitry 436 is configured to implement Institute of Electrical and Electronic Engineers (IEEE) 802.11 communication standards, also referred to herein as Wi-Fi. In other examples, other high-speed communications standards may be implemented by high-speed wireless circuitry 436.

The low-power circuitry 420 includes a low-power processor 422 and low-power wireless circuitry 424. The low-power wireless circuitry 424 and the high-speed wireless circuitry 436 of the eyewear device 100 can include short-range transceivers (Bluetooth™ or Bluetooth Low-Energy (BLE)) and wireless wide, local, or wide-area network transceivers (e.g., cellular or Wi-Fi). Mobile device 401, including the transceivers communicating via the low-power wireless connection 425 and the high-speed wireless connection 437, may be implemented using details of the architecture of the eyewear device 100, as can other elements of the network 495.

Memory 434 includes any storage device capable of storing various data and applications, including, among other things, camera data generated by the left and right visible-light cameras 114A, 114B, the infrared camera(s) 410, the image processor 412, and images generated for display by the image display driver 442 on the image display of each optical assembly 180A, 180B. Although the memory 434 is shown as integrated with high-speed circuitry 430, the memory 434 in other examples may be an independent, standalone element of the eyewear device 100. In certain such examples, electrical routing lines may provide a connection through a chip that includes the high-speed processor 432 from the image processor 412 or low-power processor 422 to the memory 434. In other examples, the high-speed processor 432 may manage addressing of memory 434 such that the low-power processor 422 will boot the high-speed processor 432 any time that a read or write operation involving memory 434 is needed.

Figure 5:
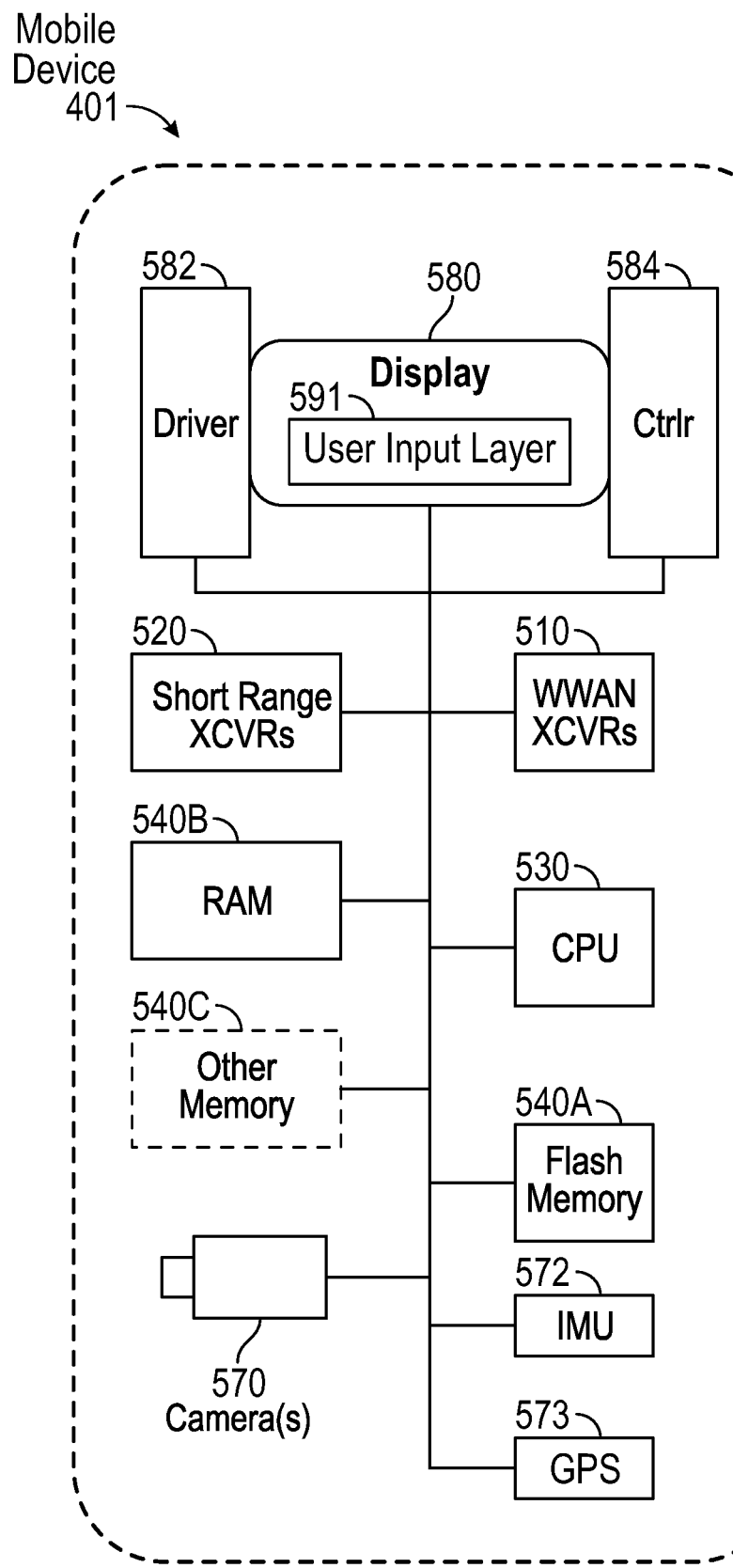
FIG. 5 is a diagrammatic representation of an example hardware configuration for a mobile device of the augmented reality production system of FIG. 4.

As shown in FIG. 4, the high-speed processor 432 of the eyewear device 100 can be coupled to the camera system (visible-light cameras 114A, 114B), the image display driver 442, the user input device 491, and the memory 434. As shown in FIG. 5, the CPU 530 of the mobile device 401 may be coupled to a camera system 570, a mobile display driver 582, a user input layer 591, and a memory 540A. The high-speed processor 432 may bidirectionally communicate with CPU 530 to perform applications, such as will be discussed in more detail in reference to FIG. 8 and FIG. 9.

The server system 498 may be one or more computing devices as part of a service or network computing system, for example, that include a processor, a memory, and network communication interface to communicate over the network 495 with an eyewear device 100 and a mobile device 401.

The output components of the eyewear device 100 include visual elements, such as the left and right image displays associated with each lens or optical assembly 180A, 180B as described in FIGS. 2A and 2B (e.g., a display such as a liquid crystal display (LCD), a plasma display panel (PDP), a light emitting diode (LED) display, a projector, or a waveguide). The eyewear device 100 may include a user-facing indicator (e.g., an LED, a loudspeaker, or a vibrating actuator), or an outward-facing signal (e.g., an LED, a loudspeaker). The image displays of each optical assembly 180A, 180B are driven by the image display driver 442. In some example configurations, the output components of the eyewear device 100 further include additional indicators such as audible elements (e.g., loudspeakers), tactile components (e.g., an actuator such as a vibratory motor to generate haptic feedback), and other signal generators. For example, the device 100 may include a user-facing set of indicators, and an outward-facing set of signals. The user-facing set of indicators are configured to be seen or otherwise sensed by the user of the device 100. For example, the device 100 may include an LED display positioned so the user can see it, a one or more speakers positioned to generate a sound the user can hear, or an actuator to provide haptic feedback the user can feel. The outward-facing set of signals are configured to be seen or otherwise sensed by an observer near the device 100. Similarly, the device 100 may include an LED, a loudspeaker, or an actuator that is configured and positioned to be sensed by an observer.

The input components of the eyewear device 100 may include alphanumeric input components (e.g., a touch screen or touchpad configured to receive alphanumeric input, a photo-optical keyboard, or other alphanumeric-configured elements), pointer-based input components (e.g., a mouse, a touchpad, a trackball, a joystick, a motion sensor, or other pointing instruments), tactile input components (e.g., a button switch, a touch screen or touchpad that senses the location, force or location and force of touches or touch gestures, or other tactile-configured elements), and audio input components (e.g., a microphone), and the like. The mobile device 401 and the server system 498 may include alphanumeric, pointer-based, tactile, audio, and other input components.

In some examples, the eyewear device 100 includes a collection of motion-sensing components referred to as an inertial measurement unit (IMU) 472. The motion-sensing components may be micro-electro-mechanical systems (MEMS) with microscopic moving parts, often small enough to be part of a microchip. The IMU 472 in some example configurations includes an accelerometer, a gyroscope, and a magnetometer. The accelerometer senses the linear acceleration of the device 100 (including the acceleration due to gravity) relative to three orthogonal axes (x, y, z). The gyroscope senses the angular velocity of the device 100 about three axes of rotation (pitch, roll, yaw). Together, the accelerometer and gyroscope can provide position, orientation, and motion data about the device relative to six axes (x, y, z, pitch, roll, yaw). The magnetometer, if present, senses the heading of the device 100 relative to magnetic north. The position of the device 100 may be determined by location sensors, such as a GPS unit 473, one or more transceivers to generate relative position coordinates, altitude sensors or barometers, and other orientation sensors. Such positioning system coordinates can also be received over the wireless connections 425, 437 from the mobile device 401 via the low-power wireless circuitry 424 or the high-speed wireless circuitry 436.

The IMU 472 may include or cooperate with a digital motion processor or programming that gathers the raw data from the components and compute a number of useful values about the position, orientation, and motion of the device 100. For example, the acceleration data gathered from the accelerometer can be integrated to obtain the velocity relative to each axis (x, y, z); and integrated again to obtain the position of the device 100 (in linear coordinates, x, y, and z). The angular velocity data from the gyroscope can be integrated to obtain the position of the device 100 (in spherical coordinates). The programming for computing these useful values may be stored in memory 434 and executed by the high-speed processor 432 of the eyewear device 100.

The eyewear device 100 may optionally include additional peripheral sensors, such as biometric sensors, specialty sensors, or display elements integrated with eyewear device 100. For example, peripheral device elements may include any I/O components including output components, motion components, position components, or any other such elements described herein. For example, the biometric sensors may include components to detect expressions (e.g., hand expressions, facial expressions, vocal expressions, body gestures, or eye tracking), to measure bio signals (e.g., blood pressure, heart rate, body temperature, perspiration, or brain waves), or to identify a person (e.g., identification based on voice, retina, facial characteristics, fingerprints, or electrical bio signals such as electroencephalogram data), and the like.

The mobile device 401 may be a smartphone, tablet, laptop computer, access point, or any other such device capable of connecting with eyewear device 100 using both a low-power wireless connection 425 and a high-speed wireless connection 437. Mobile device 401 is connected to server system 498 and network 495. The network 495 may include any combination of wired and wireless connections.

The interactive augmented reality system 400, as shown in FIG. 4, includes a computing device, such as mobile device 401, coupled to an eyewear device 100 over a network. The interactive augmented reality system 400 includes a memory for storing instructions and a processor for executing the instructions. Execution of the instructions of the interactive augmented reality system 400 by the processor 432 configures the eyewear device 100 to cooperate with the mobile device 401. The interactive augmented reality system 400 may utilize the memory 434 of the eyewear device 100 or the memory elements 540A, 540B, 540C of the mobile device 401 (FIG. 5). Also, the interactive augmented reality system 400 may utilize the processor elements 432, 422 of the eyewear device 100 or the central processing unit (CPU) 530 of the mobile device 401 (FIG. 5). In addition, the interactive augmented reality system 400 may further utilize the memory and processor elements of the server system 498. In this aspect, the memory and processing functions of the interactive augmented reality system 400 can be shared or distributed across the eyewear device 100, the mobile device 401, and the server system 498.

The memory 434 additionally includes, for execution by the processor 432, a position detection utility 460, a marker registration utility 462, a localization utility 464, a virtual object rendering utility 466, a physics engine 468, and a prediction engine 470. The position detection utility 460 configures the processor 432 to determine the position (location and orientation) within an environment, e.g., using the localization utility 464. The marker registration utility 462 configures the processor 432 to register markers within the environment. The markers may be predefined physical markers having a known location within an environment or assigned by the processor 432 to a particular location with respect to the environment within which the eyewear device 100 is operating or with respect to the eyewear itself. The localization utility 464 configures the processor 432 to obtain localization data for use in determining the position of the eyewear device 100, virtual objects presented by the eyewear device, or a combination thereof. The location data may be derived from a series of images, an IMU unit 472, a GPS unit 473, or a combination thereof. The virtual object rendering utility 466 configures the processor 432 to render virtual images for display by the image display 180 under control of the image display driver 442 and the image processor 412. The physics engine 468 configures the processor 432 to apply laws of physics such as gravity and friction to the virtual word, e.g., between virtual game pieces. The prediction engine 470 configures the processor 432 to predict anticipated movement of an object such as the eyewear device 100 based on its current heading, input from sensors such as the IMU 472, images of the environment, or a combination thereof.

FIG. 5 is a high-level functional block diagram of an example mobile device 401. Mobile device 401 includes a flash memory 540A which stores programming to be executed by the CPU 530 to perform all or a subset of the functions described herein.

The mobile device 401 may include a camera 570 that comprises at least two visible-light cameras (first and second visible-light cameras with overlapping fields of view) or at least one visible-light camera and a depth sensor with substantially overlapping fields of view. Flash memory 540A may further include multiple images or video, which are generated via the camera 570.

As shown, the mobile device 401 includes an image display 580, a mobile display driver 582 to control the image display 580, and a display controller 584. In the example of FIG. 5, the image display 580 is a touch display that includes a user input layer 591 (e.g., a touchscreen) that is layered on top of or otherwise integrated into the screen used by the image display 580.

Examples of touchscreen-type mobile devices that may be used include (but are not limited to) a smart phone, a personal digital assistant (PDA), a tablet computer, a laptop computer, or other portable device. However, the structure and operation of the touchscreen-type devices is provided by way of example; the subject technology as described herein is not intended to be limited thereto. For purposes of this discussion, FIG. 5 therefore provides a block diagram illustration of the example mobile device 401 with a user interface that includes a touchscreen input layer 591 for receiving input (by touch, multi-touch, or gesture, and the like, by hand, stylus or other tool) and an image display 580 for displaying content.

As shown in FIG. 5, the mobile device 401 includes at least one digital transceiver (XCVR) 510, shown as WWAN XCVRs, for digital wireless communications via a wide-area wireless mobile communication network. The mobile device 401 also includes additional digital or analog transceivers, such as short-range transceivers (XCVRs) 520 for short-range network communication, such as via NFC, VLC, DECT, ZigBee, Bluetooth™, or Wi-Fi. For example, short range XCVRs 520 may take the form of any available two-way wireless local area network (WLAN) transceiver of a type that is compatible with one or more standard protocols of communication implemented in wireless local area networks, such as one of the Wi-Fi standards under IEEE 802.11.

The transceivers 510, 520 (i.e., the network communication interface) conforms to one or more of the various digital wireless communication standards utilized by modern mobile networks. Examples of WWAN transceivers 510 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 510, 520 provide two-way wireless communication of information including digitized audio signals, still image and video signals, web page information for display as well as web-related inputs, and various types of mobile message communications to/from the mobile device 401.

The mobile device 401 further includes a microprocessor that functions as a central processing unit (CPU); shown as CPU 530 in FIG. 4. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The CPU 530, for example, may be based on any known or available microprocessor architecture, such as a Reduced Instruction Set Computing (RISC) using an ARM architecture, as commonly used today in mobile devices and other portable electronic devices. Of course, other arrangements of processor circuitry may be used to form the CPU 530 or processor hardware in smartphone, laptop computer, and tablet.

The CPU 530 serves as a programmable host controller for the mobile device 401 by configuring the mobile device 401 to perform various operations, for example, in accordance with instructions or programming executable by CPU 530. For example, such operations may include various general operations of the mobile device, as well as operations related to the programming for applications on the mobile device. Although a processor may be configured by use of hardwired logic, typical processors in mobile devices are general processing circuits configured by execution of programming. The CPU 530 communicates with IMU 572 and GPS 573 to obtain and use the relative or actual positional information, such as to execute applications configured to use positional data. In an example, the CPU 530, IMU 572 and GPS 573 of mobile device 401 may be used with eyewear 100 to perform various applications.

The mobile device 401 includes a memory or storage system, for storing programming and data. In the example, the memory system may include a flash memory 540A, a random-access memory (RAM) 540B, and other memory components 540C, as needed. The RAM 540B serves as short-term storage for instructions and data being handled by the CPU 530, e.g., as a working data processing memory. The flash memory 540A typically provides longer-term storage.

Hence, in the example of mobile device 401, the flash memory 540A is used to store programming or instructions for execution by the CPU 530. Depending on the type of device, the mobile device 401 stores and runs a mobile operating system through which specific applications are executed. Examples of mobile operating systems include Google Android, Apple IOS (for iPhone or iPad devices), Windows Mobile, Amazon Fire OS, RIM BlackBerry OS, or the like.

The processor 432 within the eyewear device 100 may construct a map of the environment surrounding the eyewear device 100, determine a location of the eyewear device within the mapped environment, and determine a relative position of the eyewear device to one or more objects in the mapped environment. The processor 432 may construct the map and determine location and position information using a simultaneous localization and mapping (SLAM) algorithm applied to data received from one or more sensors. In the context of augmented reality, a SLAM algorithm is used to construct and update a map of an environment, while simultaneously tracking and updating the location of a device (or a user) within the mapped environment. The mathematical solution can be approximated using various statistical methods, such as particle filters, Kalman filters, extended Kalman filters, and covariance intersection.

Sensor data includes images received from one or both of the cameras 114A, 114B, distance(s) received from a laser range finder, positional information received from GPS 473 and GPS 573, IMU 472 and IMU 572, or a combination of two or more of such sensor data, or from other sensors providing data useful in determining positional information.

Figure 6:
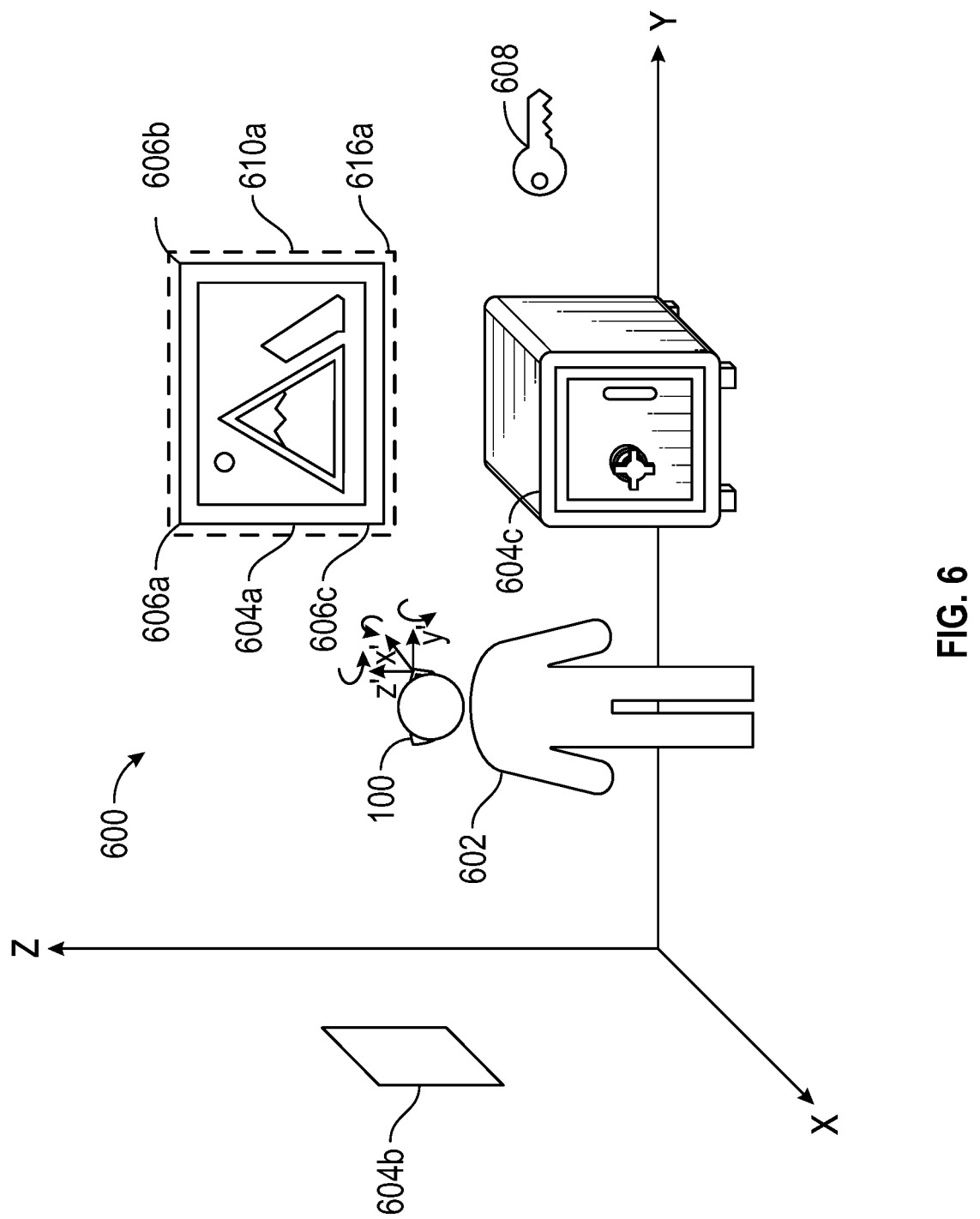
FIG. 6 is a schematic illustration of a user in an example environment for use in describing simultaneous localization and mapping.

FIG. 6 depicts an example environment 600 along with elements that are useful for natural feature tracking (NFT; e.g., a tracking application using a SLAM algorithm). A user 602 of an eyewear device 100 is present in an example physical environment 600 (which, in FIG. 6, is an interior room). The processor 432 of the eyewear device 100 determines its position with respect to one or more objects 604 within the environment 600 using captured images, constructs a map of the environment 600 using a coordinate system (x, y, z) for the environment 600, and determines its position within the coordinate system (FIG. 7) Additionally, the processor 432 determines a head pose (roll, pitch, and yaw) of the eyewear device 100 within the environment by using two or more location points (e.g., three location points 606a, 606b, and 606c) associated with a single object 604a, or by using one or more location points 606 associated with two or more objects 604a, 604b, 604c. The processor 432 of the eyewear device 100 may position a virtual object 408 (such as the key shown in FIG. 6) within the environment 600 for augmented reality viewing via image displays 180.

Figure 7:
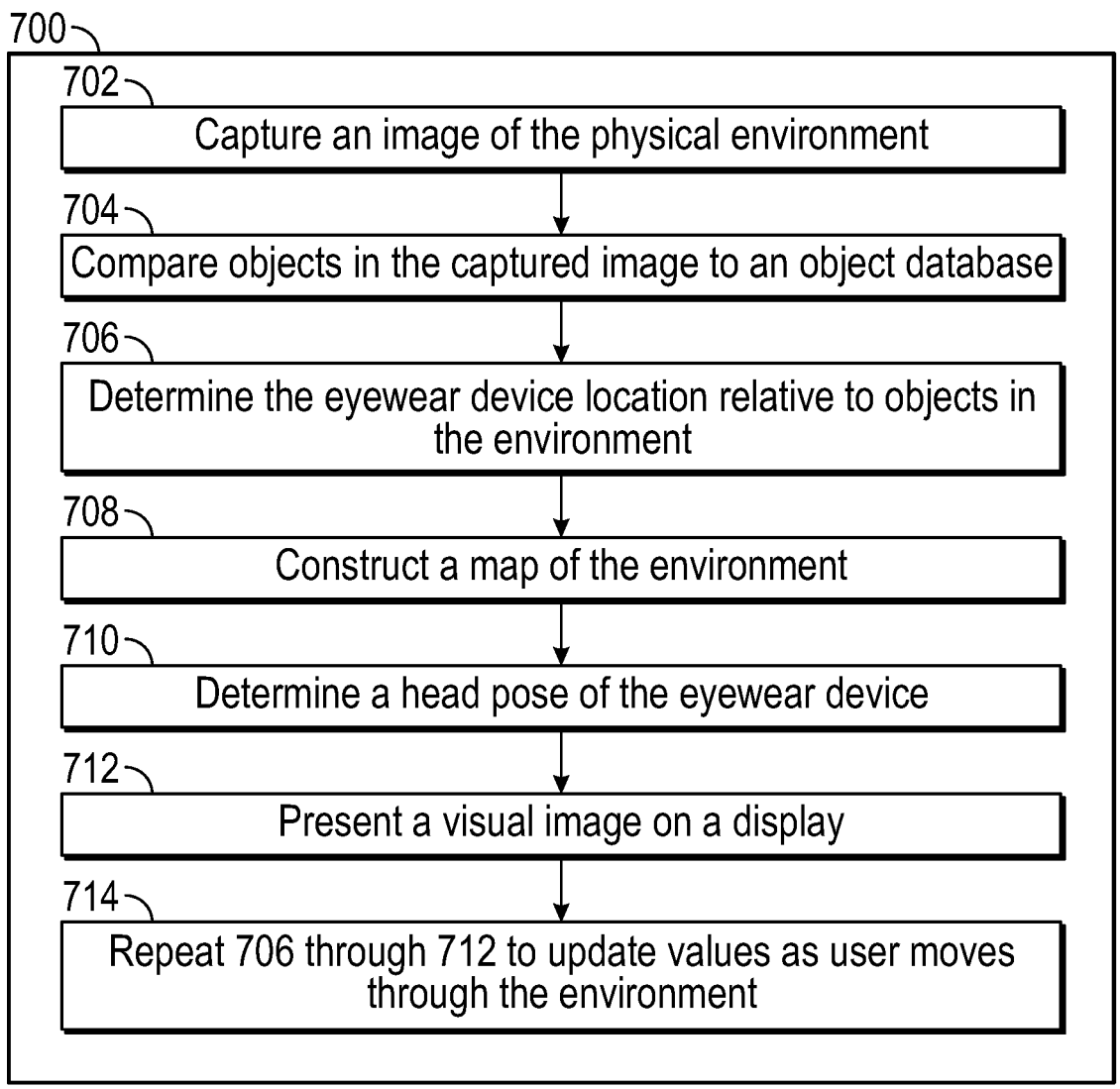
FIG. 7 is a flow chart listing steps in an example method of displaying virtual objects in a physical environment.

FIG. 7 is a flow chart 700 depicting a method for implementing augmented reality applications described herein on a wearable device (e.g., an eyewear device). Although the steps are described with reference to the eyewear device 100, as described herein, other implementations of the steps described, for other types of devices, will be understood by one of skill in the art from the description herein. Additionally, it is contemplated that one or more of the steps shown in FIG. 7, and in other figures, and described herein may be omitted, performed simultaneously or in a series, performed in an order other than illustrated and described, or performed in conjunction with additional steps.

At block 702, the eyewear device 100 captures one or more input images of a physical environment 600 near the eyewear device 100. The processor 432 may continuously receive input images from the visible light camera(s) 114 and store those images in memory 434 for processing. Additionally, the eyewear device 100 may capture information from other sensors (e.g., location information from a GPS unit 473, orientation information from an IMU 472, or distance information from a laser distance sensor).

At block 704, the eyewear device 100 compares objects in the captured images to objects stored in a library of images to identify a match. In some implementations, the processor 432 stores the captured images in memory 434. A library of images of known objects is stored in a virtual object database.

In one example, the processor 432 is programmed to identify a predefined particular object (e.g., a particular picture 604a hanging in a known location on a wall, a window 604b in another wall, or an object such as a safe 604c positioned on the floor). Other sensor data, such as GPS data, may be used to narrow down the number of known objects for use in the comparison (e.g., only images associated with a room identified through GPS coordinates). In another example, the processor 432 is programmed to identify predefined general objects (such as one or more trees within a park).

At block 706, the eyewear device 100 determines its position with respect to the object(s). The processor 432 may determine its position with respect to the objects by comparing and processing distances between two or more points in the captured images (e.g., between two or more location points on one objects 604 or between a location point 606 on each of two objects 604) to known distances between corresponding points in the identified objects. Distances between the points of the captured images greater than the points of the identified objects indicates the eyewear device 100 is closer to the identified object than the imager that captured the image including the identified object. On the other hand, distances between the points of the captured images less than the points of the identified objects indicates the eyewear device 100 is further from the identified object than the imager that captured the image including the identified object. By processing the relative distances, the processor 432 is able to determine the position within respect to the objects(s). Alternatively, or additionally, other sensor information, such as laser distance sensor information, may be used to determine position with respect to the object(s).

At block 708, the eyewear device 100 constructs a map of an environment 600 surrounding the eyewear device 100 and determines its location within the environment. In one example, where the identified object (block 704) has a predefined coordinate system (x, y, z), the processor 432 of the eyewear device 100 constructs the map using that predefined coordinate system and determines its position within that coordinate system based on the determined positions (block 706) with respect to the identified objects. In another example, the eyewear device constructs a map using images of permanent or semi-permanent objects 604 within an environment (e.g., a tree or a park bench within a park). In accordance with this example, the eyewear device 100 may define the coordinate system (x', y', z') used for the environment.

At block 710, the eyewear device 100 determines a head pose (roll, pitch, and yaw) of the eyewear device 100 within the environment. The processor 432 determines head pose by using two or more location points (e.g., three location points 606a, 606b, and 606c) on one or more objects 604 or by using one or more location points 606 on two or more objects 604. Using conventional image processing algorithms, the processor 432 determines roll, pitch, and yaw by comparing the angle and length of a lines extending between the location points for the captured images and the known images.

At block 712, the eyewear device 100 presents visual images to the user. The processor 432 presents images to the user on the image displays 180 using the image processor 412 and the image display driver 442. The processor develops and presents the visual images via the image displays responsive to the location of the eyewear device 100 within the environment 600.

At block 714, the steps described above with reference to blocks 706-712 are repeated to update the position of the eyewear device 100 and what is viewed by the user 602 as the user moves through the environment 600.

Referring again to FIG. 6, the method of implementing interactive augmented reality applications described herein, in this example, includes a virtual marker 610a associated with a virtual object(s) 608 in the environment 600. In an AR system, markers are registered at locations in the environment to assist devices with the task of tracking and updating the location of users, devices, and objects (virtual and physical) in a mapped environment. Markers are sometimes registered to a high-contrast physical object, such as the relatively dark object 604a mounted on a lighter-colored wall, to assist cameras and other sensors with the task of detecting the marker. The markers may be preassigned or may be assigned by the eyewear device 100 upon entering the environment. Markers can be encoded with or otherwise linked to information. A marker might include position information, a physical code (such as a bar code or a QR code; either visible to the user or hidden), or a combination thereof. A set of data associated with the marker is stored in the memory 434 of the eyewear device 100. The set of data includes information about the marker 610a, the marker's position (location and orientation), one or more virtual objects, or a combination thereof. The marker position may include three-dimensional coordinates for one or more marker landmarks 616a, such as the corner of the generally rectangular marker 610a shown in FIG. 6. The marker location may be expressed relative to real-world geographic coordinates, a system of marker coordinates, a position of the eyewear device 100, or other coordinate system. The one or more virtual objects associated with the marker 610a may include any of a variety of material, including still images, video, audio, tactile feedback, executable applications, interactive user interfaces and experiences, and combinations or sequences of such material. Any type of content capable of being stored in a memory and retrieved when the marker 610a is encountered or associated with an assigned marker may be classified as a virtual object in this context. The key 608 shown in FIG. 6, for example, is a virtual object displayed as a still image, either 2D or 3D, at a marker location.

In one example, the marker 610a may be registered in memory as being located near and associated with a physical object 604a (e.g., the framed work of art shown in FIG. 6). In another example, the marker may be registered in memory as being a particular position with respect to the eyewear device 100.

Figure 8:
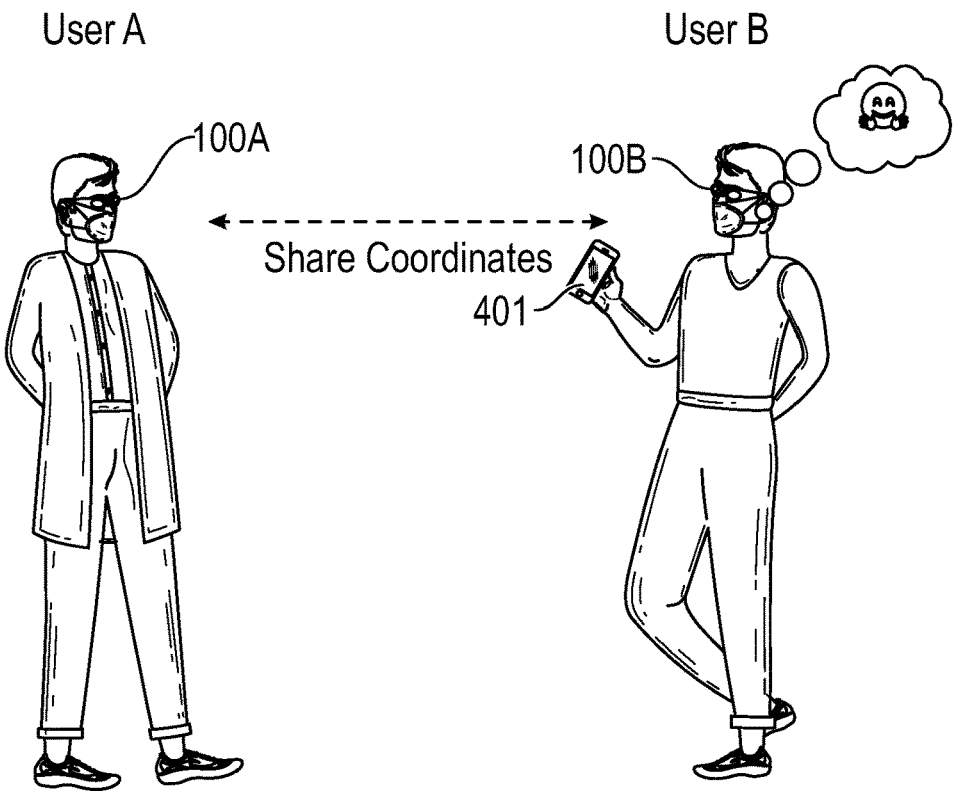
FIG. 8 illustrates two users of a respective eyewear device each determining a respective position in an environment, such as an (x, y, z) coordinate position.
Figure 9:
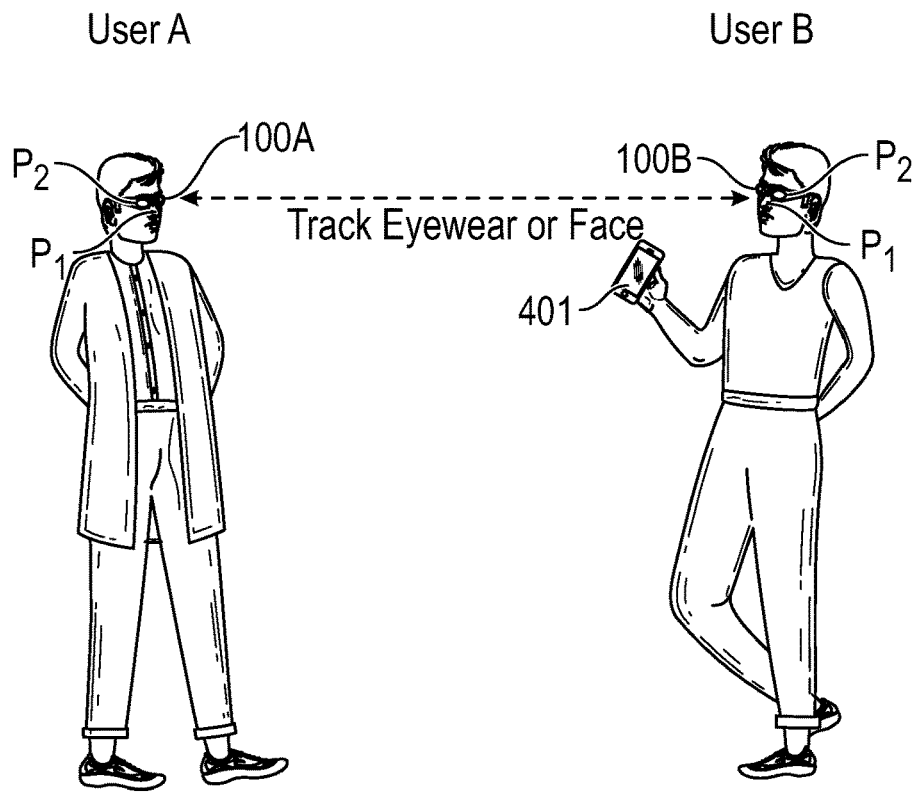
FIG. 9 illustrates eyewear devices being aligned using respective six degrees of freedom (6DOF) tracker trajectories.

As described with respect to FIG. 8, a first eyewear device 100A operated by a user A, and a second eyewear device 100B operated by a user B, can each determine its position in the same interior room using the SLAM algorithm described. The second eyewear 100B also constructs a map of the environment 600 using the same coordinate system (x, y, z) for the environment 600, and determines its position within the same coordinate system. Multiple eyewear devices 100 can determine their position in the same coordinate system for multi-player interaction, and limitation to two eyewear devices 100 in environment 600 is not to be inferred. Each eyewear device 100A and 100B can share its (x, y, z) position via messaging using short range communication techniques via wireless circuitry 424, such as Bluetooth® and WiFi, or via wireless circuitry 436 and network 495 (FIG. 4).

The SLAM algorithm of each user eyewear device 100 also determines a physical attribute of a user of another eyewear device 100, such as a face or head, in the interior room. The processor 432 is configured to identify the physical attribute in the plurality of frames generated by cameras 114A and 114B. For example, the SLAM algorithm uses facial recognition software to determine the face or mouth of the other user. The eyewear device 100 may also store face images in a library of images, such as in a database, to perform automatic identification of another user by comparing a detected face image to the database of images for a match.

In one example, when the eyewear devices 100A and 100B are in a session, and communicating with each other, such as via network 495 or directly using a low power signal such as based on Bluetooth™, the respective (x, y, z) coordinate positions of each eyewear device 100 are shared with the other eyewear devices(s) automatically.

In another example, the eyewear device 100 of one user can share its (x, y, z) coordinate position with the other eyewear device 100 by using mobile device 401. For example, eyewear device 100B of user B can share its (x, y, z) coordinate position with eyewear device 100A by tapping an icon on touch display 580 of the synched mobile device 401 of user B, as shown in FIG. 8.

Multiple eyewear devices 100 can determine their position in the same coordinate system for multi-player interaction, and limitation to two eyewear devices 100 in environment 600 is not to be inferred. Each eyewear device 100A and 100B can share its (x, y, z) position via messaging using short range communication techniques via wireless circuitry 424, such as Bluetooth® and WiFi, or via wireless circuitry 436 and network 495 (FIG. 4).

Figure 10:
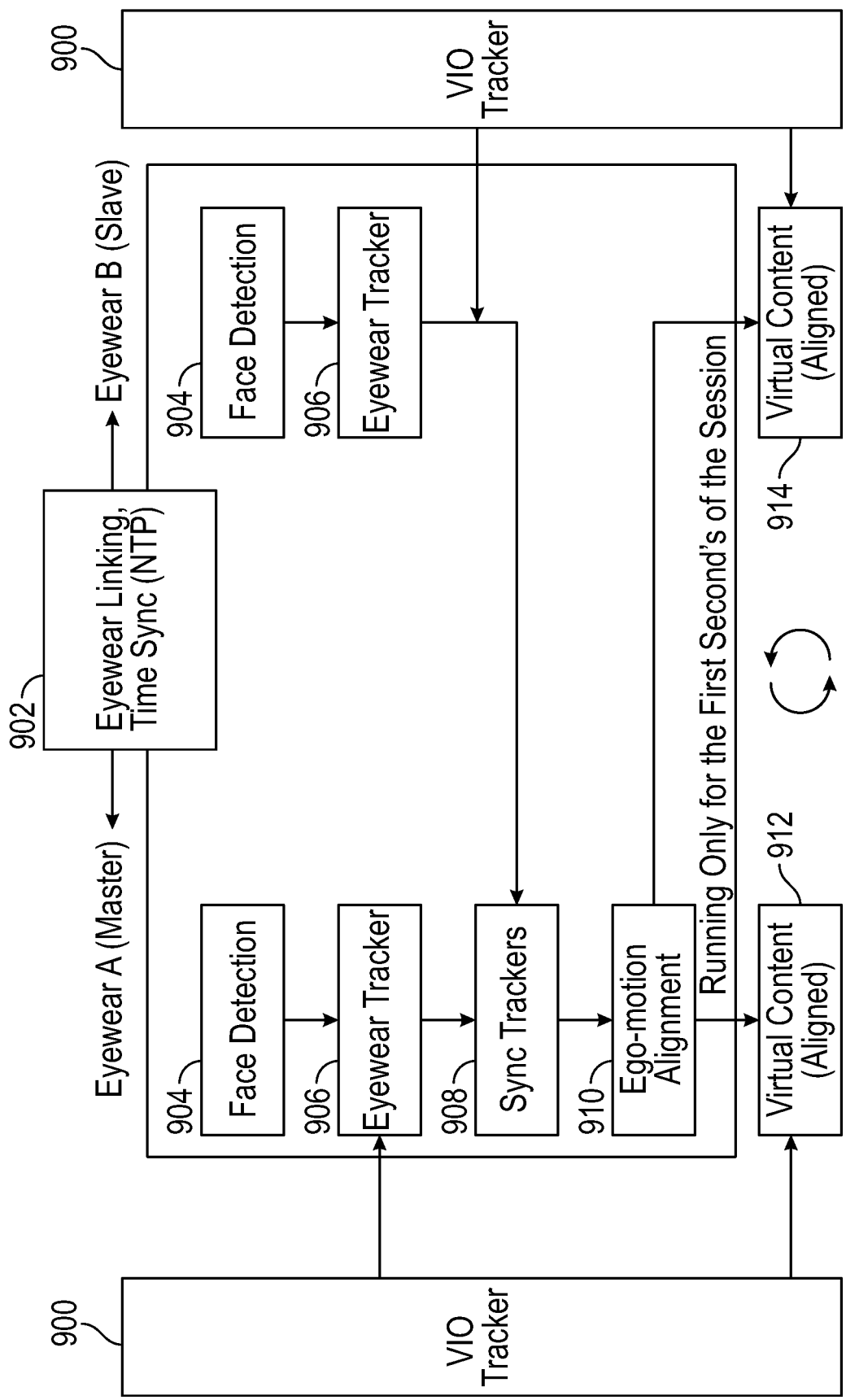
FIG. 10 is a system illustrating a method of aligning the eyewear devices.

Referring to FIG. 10, there is illustrated an example of establishing a collaborative AR experience between users of eyewear devices 100 by using alignment between respective 6DOF trajectories generated by 6DOF pose trackers 900, also referred to herein as ego motion alignment. In one example, the 6DOF pose tracker comprises a visual inertial odometry (VIO) pose tracker, although other types of 6DOF pose trackers can be used as well. Eyewear device 100A of user A and eyewear device 100B of user B track the eyewear device of the other user, or an object of the other user, such as on the user's face, to provide the collaborative AR experience. This enables sharing common 3D content between multiple eyewear users without using or aligning to common image content such as a marker as described with reference to FIG. 6, which is a more lightweight solution with reduced computational burden on processor 432. It is sufficient to run a local odometry system on every eyewear device 100 along with cross-tracking of devices or faces to avoid the full global mapping pipeline, which saves memory as well as computational resources. This allows users of eyewear devices 100 to add virtual 3D content and see the 3D content properly positioned through their eyewear device 100. Each user can simultaneously modify the virtual 3D content. This disclosure also prevents piracy issues as it does not require sharing of images between eyewear devices 100. Users only need to be able to see the other user for a short time period from roughly frontal positions.

The ego-motion alignment method is novel as the eyewear devices 100 (or any rigidly mounted part or feature, like a wearer's face) are shortly seen by each other's eyewear devices 100. This provides unique information and sufficient constraints to solve the alignment problem. This does not require the eyewear seeing the same part of a scene such as described with reference to FIG. 6.

In this example, a system and method of aligning the eyewear devices 100 of two users, user A and user B, is described, although essentially any number of users is possible in accordance with this disclosure.

Each user A and user B starts her/his eyewear device 100A and 100B wherein the respective processor 432 runs in the background the 6DOF pose tracker 900 to track a trajectory of the respective eyewear device 100A and 100B. The 6DOF pose tracker 900 is a 3D or VIO pose tracker that tracks the device pose in six degrees of freedom (x, y, z, pitch, yaw, roll) using IMU 472 and camera images 302A and 302B to estimate the pose of the respective IMU 472. The IMU 472 is the reference body, not the cameras, and thus the full pose of the user is determined at any time, including regular timestamps. The full 6DOF pose of the user stands for the translation and orientation of the IMU 472, expressed in the coordinate system with its origin at the beginning of the operation of the eyewear device 100. In the case of smart glasses including eyewear device 100, the IMU 472 and one or more cameras 114A and 114B are rigid parts of the eyewear device 100, where the rigid transformation is known via an eyewear device calibration process. This means that the VIO pose reflects the pose (position and orientation) of the wearer's face in 3D space. An off-the-shelf VIO pose tracker can be used for the purpose of the ego-motion alignment method. There are commercially available VIO pose trackers, such as the ARCore™ from Google® of Mountain View, California, and the ARKit™ from Apple® of Cupertino, California.

The two eyewear devices 100 have synchronized clocks and so the time-synched VIO poses are synched, done, e.g., by Network Time Protocol (NTP) 902, a known networking protocol for clock synchronization between computer systems over packet-switched, variable-latency data networks.

The VIO pose trackers 900 are gravity aligned. This means that one of their coordinate axes (typically z-coordinate) is oriented towards the earth's center. The IMU 472 determines gravity alignment. The remaining rotational ambiguity to be estimated is thus only one-dimensional. It means that only one angle is needed to be estimated for the orientational part of the alignment transformation. For the translational part, three numbers (x, y, z), thus four in total, need to be estimated. For rotation angles, the alignment of the "roll" and "pitch" angle is implicitly done because of the initialization of each VIO pose tracking system 900 against the gravity. However, each VIO initialization has a "yaw" angle ambiguity, which is resolved as follows.

The processor 432 of each wearer's eyewear device 100 starts a face detection method using a face detector 904. An off-the-shelf method (such as a computer vision algorithm implementing an eigen face technique) can be used by the processor 432 and cameras 114A and 114B to detect the face of the other eyewear device user.

There are two options for the ego-motion alignment. According to one option, as the face detector 904 runs, the processor 432 picks a fixed point P1 on a symmetry plane on the other user's face, e.g., a nose, chin, etc., and its x,y coordinates in each image 302A and 302B (e.g., at 30 fps rate) is output for further processing. The symmetry plane is important to constraint enough the problem and make it solvable. In this case, one additional unknown is added into the system, a lever arm distance of the IMU 472 of the other eyewear device to the point P1, such as the distance from the IMU 472 to the user's nose in this example. It stems from the fact that this lever arm distance is unique but unknown for each user.

In a second option, the processor 432 uses the face detection of the first option, e.g., a bounding box of the face in the image 302A and 302B to initialize a more accurate eyewear device 100 tracker 906. A full 3D model, such as a computer aided design (CAD) model, of the eyewear device 100 is known and stored in memory 434 as the eyewear devices 100 are made by the same manufacturer, and the processor 432 runs a more sophisticated and accurate tracking algorithm to track a point P2 on the eyewear device 100 instead of on the face. In this case, the lever arm additional unknown is eliminated as the relation of the tracked point P2 on the eyewear device 100 to the IMU 472 is known using the CAD model. Both options are solvable, but the second option possesses higher robustness against the noise on the tracked points. Again, knowing the x,y coordinates of point P2 in some camera images 302A and 302B is where the detection succeeds.

For a pose for each camera image (Global Shutter Camera) or image line (Rolling Shutter camera) the processor 432 detects a face feature P1 of the other user or the eyewear device feature P2 of the other user along with their x,y image coordinates. This detection is performed by the processor 432 of each eyewear device 100 for user A and user B. It is not mandatory for each eyewear device 100 to simultaneously see the other eyewear device 100 or user. This means that user A can see user B, for example, in the first 5 seconds, then there might be a time gap of not seeing each other at all, then the user B sees user A shortly, then the user A again sees user B gain, and so on. The face/eyewear tracklets, which are fragments of the track followed by the respective moving eyewear device 100, with their corresponding 6DOF VIO poses are sent over to server system 498, or to the other eyewear device 100 where the processing happens.

The x,y coordinates of the user face or eyewear device tracklets generated by trackers 906 and their corresponding 6DOF poses of the gravity aligned and time synchronized VIO pose trackers 908 are used by processor 432 to build matrices to arrive at a Quadratic Eigenvalue Problem (QEP). QEP is a well understood problem in Linear Algebra and can be solved by processor 432 in a closed form as a generalized Eigenvalue Problem. Solving a QEP using processor 432 requires only tracks with 3 or 4 positions. The minimal solver needs 4 points (in case of face feature tracking) or 3 points (in case of eyewear device tracking) which allows it to be embedded into a robust estimation procedure. QEP allows for over constrained as well as for minimal solution.

The output of the QEP is the yaw-angle difference and the 3D translation of the alignment transformation. In the case of tracking the face point P1 (e.g., nose), in addition, the 3D lever arm unknown vector per user is estimated too.

The eyewear ego motion alignment transformation 910 can be estimated in a few seconds, but as more new face/eyewear detections become available, the estimate can be refined and thus be more accurate.

The refinement can be viewed as solving the over constrained QEP or more accurate non-linear optimization. The non-linear optimization can be formulated either as a gradient descent-based minimizer with sparse matrices, or as a Gaussian Loopy Belief Propagation on a factor graph, both with robust kernels to cope with outliers.

Once the ego motion alignment transformation 910 is estimated by processor 432, it allows processor 432 to transform a virtual 3D content 912 from a local coordinate system of one user/eyewear device to another user/eyewear device at 914. The same virtual 3D content 912 can then be projected and properly rendered into the eyewear device 100 of both users such that the projected 3D content is synchronized and properly displayed i.e., rendered from the correct viewpoint per user.

Figure 11:
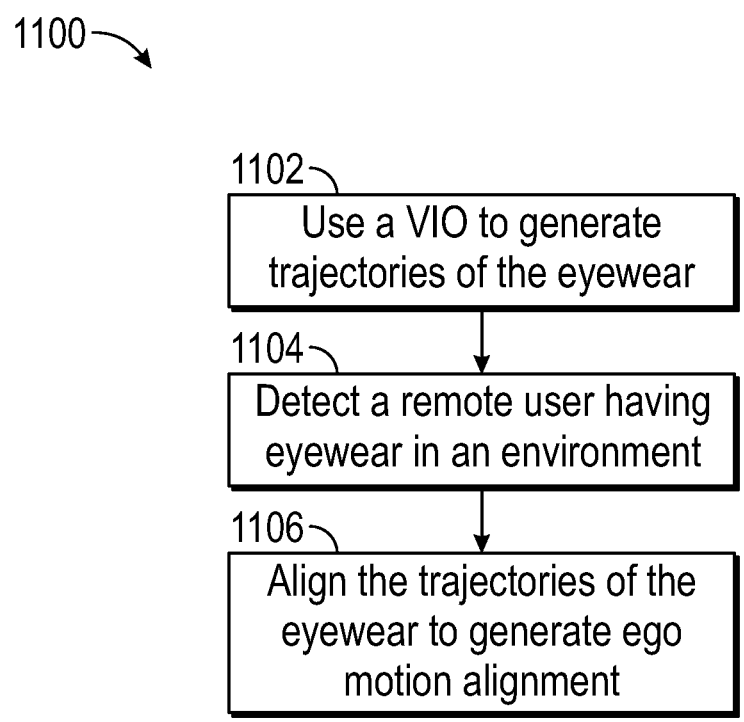
FIG. 11 is a flow chart of aligning the eyewear devices.

FIG. 11 is a flow chart 1100 depicting a method for implementing augmented reality applications including aligning VIO trajectories of an eyewear device with VIO trajectories of the remote eyewear device to generate ego motion alignment of the eyewear devices. Although the steps are described with reference to the eyewear device 100, as described herein, other implementations of the steps described, for other types of devices, will be understood by one of skill in the art from the description herein. Additionally, it is contemplated that one or more of the steps shown in FIG. 11, and in other figures, and described herein may be omitted, performed simultaneously or in a series, performed in an order other than illustrated and described, or performed in conjunction with additional steps.

At block 1102, the processor 432 of eyewear device 100A uses the VIO pose tracker 900 to generate trajectories of the eyewear device 100A. The VIO pose tracker 900 is a 6DOF pose tracker that tracks the head pose of user A in six degrees of freedom (x, y, z, pitch, yaw, roll) using IMU 472 and camera images 302A and 302B to estimate the pose of the respective IMU 472. The IMU 472 is the reference body, not the cameras, and thus the full pose of the user is determined at regular time instants. The full 6DOF pose of the user stands for the translation and orientation of the IMU 472, expressed in the coordinate system with its origin at the beginning of the operation of the eyewear device 100A. In the case of smart glasses including eyewear device 100, the IMU 472 and one or more cameras 114A and 114B are rigid parts of the eyewear device 100, where the rigid transformation is known via an eyewear device calibration process. This means that the VIO pose reflects the pose (position and orientation) of the wearer's face in 3D space.

At block 1104, the processor 432 uses face detector 904 of eyewear device 100A to detect a remote user B wearing the remote eyewear device 100B in an environment, wherein the remote eyewear device 100B is also configured to generate trajectories using the remote VIO pose tracker 900. The processor 432 uses cameras 114A and 114B to detect the face of the other eyewear device user. For a pose for each camera image (Global Shutter Camera) or image line (Rolling Shutter camera) the processor 432 detects a face feature P1, or the eyewear device feature P2, along with their x,y image coordinates. This detection is performed by the processor 432 of each eyewear device 100A and 100B for user A and user B. It is not mandatory for each eyewear device 100 to simultaneously see the other eyewear device 100 or user. This means that user A can see user B, for example, in the first 5 seconds, then there might be a time gap of not seeing each other at all, then the user B sees user A shortly, then the user A again sees user B gain, and so on.

At block 1106, the processor 432 of eyewear device 100A aligns the VIO trajectories of the eyewear device 100A with VIO trajectories of the remote eyewear device 100B to generate ego motion alignment of the eyewear device 100A with the remote eyewear device 100B. There are at least two options for the ego-motion alignment. According to one option, as the face detector 904 runs, the processor 432 picks a fixed point P1 on a symmetry plane on the other user's face, e.g., a nose, chin, etc., and its x,y coordinates in each image 302A and 302B (e.g., at 30 fps rate) is output for further processing. The symmetry plane is important to constraint enough the problem and make it solvable. In this case, one additional unknown is added into the system, a lever arm distance of the IMU 472 to the point P1, such as the distance from the IMU 472 to the user's nose in this example. It stems from the fact that this lever arm distance is unique but unknown for each user.

In a second option, the processor 432 uses the face detection of the first option, e.g., a bounding box of the face in the image 302A and 302B to initialize a more accurate eyewear device 100 detector 904. A full 3D model, such as a computer aided design (CAD) model, of the eyewear device 100 is known and stored in memory 434 as the eyewear devices 100 are made by the same manufacturer, and the processor 432 runs a more sophisticated and accurate tracking algorithm to track a point P2 on the eyewear device 100 instead of on the face. In this case, the lever arm additional unknown is eliminated as the relation of the tracked point P2 on the eyewear device 100 to the IMU 472 is known using the CAD model. Both options are solvable, but the second option possesses higher robustness against the noise on the tracked points. Again, knowing the x,y coordinates of point P2 in some camera images 302A and 302B is where the detection succeeds.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as plus or minus ten percent from the stated amount or range.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. Eyewear, comprising:
    a camera configured to generate an image;
    a display;
    an inertial measurement unit (IMU);
    a six degrees of freedom (6DOF) pose tracker; and
    a processor configured to:
        use the 6DOF pose tracker to generate trajectories of the eyewear;
        use the IMU to align the trajectories of the 6DOF pose tracker;
        detect a remote user having a remote device in an environment, wherein the remote device is configured to generate trajectories using a remote 6DOF pose tracker;
        identify a point on the remote device; and
        align the trajectories of the eyewear with the trajectories of the remote device to establish a shared coordinate system between the eyewear and the remote device, wherein the processor is configured to use the identified point to align the trajectories.

2. The eyewear of claim 1, wherein 6DOF pose tracker comprises a visual inertial odometry (VIO) tracker, wherein the processor is configured to generate gravity aligned trajectories.

3. The eyewear of claim 1, wherein the processor determines a position of the remote user eyewear as an (x, y) coordinate in the image.

4. The eyewear of claim 1, wherein the eyewear has a local coordinate system, and the processor is configured to align the local coordinate system with a local coordinate system of the remote device.

5. The eyewear of claim 1, wherein the processor is configured to use the aligned trajectories to transform poses of the eyewear into the shared coordinate system.

6. The eyewear of claim 1, wherein the processor is configured such that a user of the eyewear and the remote user of the remote device see the same 3D virtual content in a same place on the respective display based on the shared coordinate system.

7. The eyewear of claim 6, wherein the processor is configured to synchronize the eyewear 3D virtual content with the 3D virtual content of the remote device.

8. An interactive augmented reality method for use of eyewear having a camera configured to generate an image, a display, an inertial measurement unit (IMU), a six degrees of freedom (6DOF) pose tracker, and a processor, the processor:
    using the 6DOF pose tracker to generate trajectories of the eyewear;
    using the IMU to align the trajectories of the 6DOF pose tracker;
    detecting a remote user having a remote device in an environment, wherein the remote device generates trajectories using a remote 6DOF pose tracker;
    identifying a point on the remote device; and
    aligning the trajectories of the eyewear with the trajectories of the remote device to establish a shared coordinate system between the eyewear and the remote device, wherein the processor uses the identified point to align the trajectories.

9. The method of claim 8, wherein the 6DOF pose tracker comprises a visual inertial odometry (VIO), wherein the processor generates gravity aligned trajectories.

10. The method of claim 8, wherein the processor determines a position of the eyewear as an (x, y) coordinate in the image.

11. The method of claim 8, wherein the eyewear has a local coordinate system, and the processor aligns the local coordinate system with a local coordinate system of the remote device.

12. The method of claim 8, wherein the processor uses the aligned trajectories to transform poses of the eyewear into the shared coordinate system.

13. The method of claim 8, wherein a user of the eyewear and the remote user of the remote device see the same 3D virtual content in a same place on the respective display based on the shared coordinate system.

14. The method of claim 13, wherein the processor synchronizes the eyewear 3D virtual content with the 3D virtual content of the remote device.

15. A non-transitory computer-readable medium storing program code which, when executed, is operative to cause an electronic processor of eyewear having a camera configured to generate a image, a display, an inertial measurement unit (IMU), and a six degrees of freedom (6DOF) pose tracker to perform the steps of:
    using the 6DOF pose tracker to generate trajectories of the eyewear;
    use the IMU to align the trajectories of the 6DOF pose tracker;
    detecting a remote user having a remote device in an environment, wherein the remote device generates trajectories using a remote 6DOF pose tracker;
    identifying a point on the remote device; and aligning the trajectories of the eyewear with the trajectories of the remote device to establish a shared coordinate system between the eyewear and the remote device, wherein the identified point is used to align the trajectories.

16. The non-transitory computer-readable medium storing program code of claim 15, wherein the 6DOF pose tracker comprises a visual inertial odometry (VIO), wherein the processor generates gravity aligned trajectories.

17. The non-transitory computer-readable medium storing program code of claim 15, further comprising code configured to determine a position of the eyewear as an (x, y) coordinate in the image.

18. The non-transitory computer-readable medium storing program code of claim 15, wherein the eyewear has a local coordinate system, and the code is configured to align the local coordinate system with a local coordinate system of the remote device.

19. The non-transitory computer-readable medium storing program code of claim 15, further comprising code configured to use the aligned trajectories to transform poses of the eyewear into the shared coordinate system.

20. The non-transitory computer-readable medium storing program code of claim 15, further comprising code configured to synchronize the eyewear 3D virtual content with 3D virtual content of the remote device.

\* \* \* \* \*